(12) United States Patent
Chang et al.

(10) Patent No.: US 10,148,995 B2
(45) Date of Patent: Dec. 4, 2018

(54) METHOD AND APPARATUS FOR TRANSMITTING AND RECEIVING DATA IN COMMUNICATION SYSTEM

(71) Applicant: Samsung Electronics Co., Ltd., Suwon-si, Gyeonggi-do (KR)

(72) Inventors: Young-Bin Chang, Anyang-si (KR); Young-Joong Mok, Suwon-si (KR); Sang-Wook Kwon, Yongin-si (KR); Kyung-Kyu Kim, Suwon-si (KR); Jong-Hyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/257,400

(22) Filed: Sep. 6, 2016

(65) Prior Publication Data

US 2017/0070765 A1    Mar. 9, 2017

(30) Foreign Application Priority Data

Sep. 7, 2015    (KR) .................. 10-2015-0126423

(51) Int. Cl.
| | |
|---|---|
| *H04N 21/434* | (2011.01) |
| *H04N 21/414* | (2011.01) |
| *H04N 21/61* | (2011.01) |
| *H04W 76/23* | (2018.01) |
| *H04W 76/14* | (2018.01) |
| *H04W 76/15* | (2018.01) |

(52) U.S. Cl.
CPC ... *H04N 21/41407* (2013.01); *H04N 21/6131* (2013.01); *H04W 76/23* (2018.02); *H04W 76/14* (2018.02); *H04W 76/15* (2018.02)

(58) Field of Classification Search
CPC ........................................ G06F 17/30
See application file for complete search history.

(56) References Cited

U.S. PATENT DOCUMENTS

| | | | | |
|---|---|---|---|---|
| 5,831,664 A | * | 11/1998 | Wharton | ............... H04N 7/163 345/156 |
| 8,141,115 B2 | * | 3/2012 | Wohlert | ............ H04N 7/17318 709/218 |
| 8,997,169 B2 | * | 3/2015 | McCoy | ............... H04N 21/654 386/201 |

(Continued)

FOREIGN PATENT DOCUMENTS

| | | |
|---|---|---|
| EP | 2763376 A2 | 8/2014 |
| JP | 5517415 B2 | 6/2014 |

(Continued)

*Primary Examiner* — Dominic D Saltarelli
(74) *Attorney, Agent, or Firm* — Jefferson IP Law, LLP

(57) ABSTRACT

A method and apparatus for transmitting and receiving data in a communication system are disclosed and relate to 5th generation (5G) or pre-5G communication system that will be provided to support a higher data transmission rate after the 4G communication system, such as long term evolution (LTE). A method for transmitting data by a transmitting device in a wireless communication system that supports device-to-device (D2D) communication, may include separating, from a piece of video container data, video data and video-related data that is output together with the video data, outputting the video data, and transmitting the video-related data to a receiving device.

36 Claims, 20 Drawing Sheets

(56) References Cited

U.S. PATENT DOCUMENTS

| | | | |
|---|---|---|---|
| 2006/0170778 A1 | 8/2006 | Ely et al. | |
| 2006/0234625 A1 | 10/2006 | Sutardja | |
| 2008/0077965 A1* | 3/2008 | Kamimaki | H04N 7/163 |
| | | | 725/105 |
| 2008/0291863 A1 | 11/2008 | Agren | |
| 2012/0191805 A1* | 7/2012 | Fee | H04N 21/2343 |
| | | | 709/217 |
| 2015/0043440 A1* | 2/2015 | Ko | H04W 74/04 |
| | | | 370/329 |
| 2015/0245384 A1* | 8/2015 | Nambord | H04B 5/0031 |
| | | | 455/41.1 |
| 2015/0327138 A1* | 11/2015 | Lee | H04W 76/064 |
| | | | 455/426.1 |
| 2017/0070765 A1* | 3/2017 | Chang | H04N 21/41407 |

FOREIGN PATENT DOCUMENTS

| | | |
|---|---|---|
| KR | 10-2008-0041396 A | 5/2008 |
| KR | 10-2015-0010066 A | 1/2015 |
| KR | 10-2015-0013999 A | 2/2015 |
| KR | 10-2015-0018663 A | 2/2015 |
| KR | 10-2015-0023189 A | 3/2015 |
| KR | 10-2015-0026639 A | 3/2015 |
| KR | 10-2015-0029453 A | 3/2015 |
| KR | 10-1500177 B1 | 3/2015 |

\* cited by examiner

METHOD AND APPARATUS FOR TRANSMITTING AND RECEIVING DATA IN COMMUNICATION SYSTEM

CROSS-REFERENCE TO RELATED APPLICATION(S)

This application claims the benefit under 35 U.S.C. § 119(a) of a Korean patent application filed on Sep. 7, 2015 in the Korean Intellectual Property Office and assigned Serial number 10-2015-0126423, the entire disclosure of which is hereby incorporated by reference.

TECHNICAL FIELD

The present disclosure relates to a method and an apparatus for transmitting and receiving data by using device-to-device (D2D) communication in a communication system.

BACKGROUND

Efforts to develop an improved 5th-generation (5G) communication system or a pre-5G communication system have been made in order to meet demand for radio data traffic that has been on the rise since the 4th-generation (4G) communication system became commercially available. For this reason, the 5G communication system or the pre-5G communication system is called a beyond-4G network communication system or a post long term evolution (LTE) system.

To attain a high data transmission rate, the 5G communication system is considered to be implemented in an ultra-high frequency (mmWave) band (e.g., a band of 60 GHz). In order to attenuate a path loss of waves and in order to increase the transmission distance of waves in the ultra-high frequency band, technologies of beamforming, massive multi-input multi-output (MIMO), full dimensional MIMO (FD-MIMO), array antennas, analog beam-forming, and large scale antennas are discussed in the 5G communication system.

In addition, in order to improve a network of the system, technologies of evolved small cells, advanced small cells, a cloud radio access network (RAN), an ultra-dense network, device-to-device (D2D) communication, wireless backhaul, a moving network, cooperative communication, coordinated multi-points (CoMP), and receiving interference cancellation have been developed in the 5G communication system.

Furthermore, being developed in the 5G system are: hybrid FSK and QAM modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access techniques.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting and receiving data by using a device-to-device (D2D) communication scheme in the communication system.

Another aspect of the present disclosure is to provide a method and an apparatus for transmitting and receiving data that is related to videos by using a D2D communication scheme in the communication system.

In accordance with an aspect of the present disclosure, a method for transmitting data by a transmitting device in a communication system that supports D2D communication is provided. The method includes separating, from a piece of video container data, video data and video-related data that is output together with the video data, outputting the video data, and transmitting the video-related data to a receiving device.

In accordance with another aspect of the present disclosure, a method for receiving data by a receiving device in a communication system that supports D2D communication is provided. The method includes receiving, from a transmitting device, video-related data that is output together with video data, wherein the video data and the video-related data are separated from a piece of video container data, and outputting the video-related data.

In accordance with another aspect of the present disclosure, a transmitting device for transmitting data in a communication system that supports D2D communication is provided. The device includes a control unit that makes a control to separate, from a piece of video container data, video data and video-related data that is output together with the video data and to output the video data, and a transmitting unit that transmits the video-related data to a receiving device.

In accordance with another aspect of the present disclosure, a receiving device for receiving data in a communication system that supports D2D communication is provided. The device includes a receiving unit that receives video-related data that is output together with video data, wherein the video data and the video-related data are separated from a piece of video container data, and a control unit that makes a control to output the video-related data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to the subject matter of the present disclosure, a transmitting device of a communication system separates video data and video-related data from a piece of video container data in order to thereby transmit the video-related data to a receiving device, and the receiving device outputs the video-related data that is synchronized with the video data that is output in the transmitting device.

To this end, a method and an apparatus for transmitting and receiving data in the communication system, according to the embodiment of the present disclosure, will be described in detail.

Figure 1:
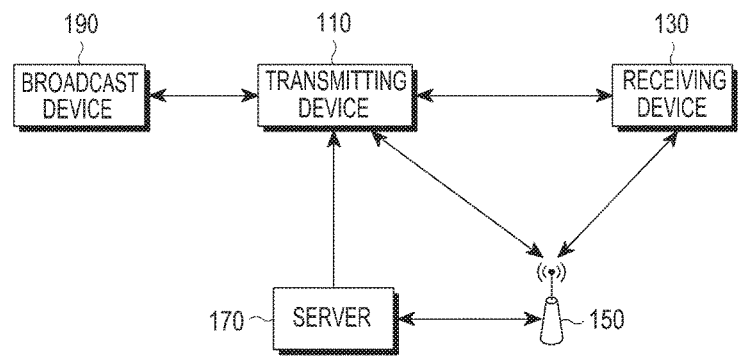
FIG. 1 is a view illustrating a communication system, according to an embodiment of the present disclosure.

FIG. 1 shows a communication system, according to an embodiment of the present disclosure.

Referring to FIG. 1, the communication system includes a transmitting device 110 and a receiving device 130 (the devices 110 and 130 can be transceivers). Additionally, the communication system may further include at least one of a radio node 150 that manages radio resources according to a communication environment, a server 170 that transmits and receives media data to and from the transmitting device 110 and the receiving device 130, or a broadcast device 190 that supports sky wave broadcasts.

Here, the transmitting device 110, for example, may be a display device for displaying/providing videos, and the receiving device 130, for example, may be a play device for reproducing at least one of videos, text, or sounds. In addition, the broadcast device 190, for example, may be a broadcasting station.

The transmitting device 110 communicates with the receiving device 130 or the radio node 150. More specifically, the transmitting device 110 receives a video file from the server 170 or from the broadcast device 190, or has video files that are stored in the transmitting device 110. In addition, the transmitting device 110 decodes the content corresponding to the video file in order to thereby separate video data and video-related data (for example, data that is to be simultaneously output with the video data, such as sounds, text, or images) that is to be synchronized with the video data. In addition, the transmitting device 110 outputs the video data through a video output unit and transmits the video-related data to the receiving device 130 or to the radio node 150. At this time, the radio node 150 may be a base station in the case where the communication system is a broadband wireless communication system, or may be an access point (AP) in the case where the communication system is a wireless local area network (LAN) system.

The transmitting device 110 may transmit the video-related data to the receiving device 130 or to the radio node 150 in at least three manners, as described below.

First, the transmitting device 110 may transmit the video-related data to other devices by using a broadcasting technique. For example, in the broadband communication system, the transmitting device 110 may transmit the video-related data to all of the receiving devices 130 that are permitted to use the D2D communication scheme by the carrier. As another example, the transmitting device 110 may transmit video-related data by means of a broadcast message, such as a beacon frame, in the Wi-Fi communication system.

Second, in order to transmit the video-related data to only the receiving devices 130 that are included in a specific group, the transmitting device 110 may transmit the same to the receiving device 130 that are pre-grouped.

Third, the transmitting device 110 may transmit the video-related data to one specific receiving device 130 by using a unicast technique. For example, in the broadband communication system, the transmitting device 110 may transmit the video-related data to only a specific receiving device 130 among the receiving devices that are permitted to use the D2D communication scheme by the carrier. As another example, the transmitting device 110 may transmit the video-related data to only a receiving device 130 that has performed a pairing by using a Bluetooth function in the communication system.

One example of the methods of transmitting the video-related data by the transmitting device 110 described above will be described in detail with reference to FIGS. 2A, 2B, 2C, 2D, 3, 4, 5A, 5B, 6, and 7.

Referring to FIG. 1, the receiving device 130 communicates with the transmitting device 110 or the radio node 150. The receiving device 130 receives, from the transmitting device 110 or the radio node 150, video-related data that is to be synchronized with video data. In addition, in the case where the video-related data is audio data, the receiving device 130 decodes the audio data and outputs the decoded audio data through an internal audio output unit (for example, audio devices, such as headphones or earphones, or aux-out devices) while being synchronized with the video data. In addition, in the case where the video-related data is text data (for example, subtitles), the receiving device 130 outputs the text data through an internal video output unit while being synchronized with the video data. The detailed operation of the receiving device 130 will be described with reference to FIGS. 9, 10, 11, 12, and 13.

The radio node 150 plays the role of managing and controlling the radio resources when the video-related data is transmitted and received between the transmitting device 110 and the receiving device 130. For example, the radio node 150 may allocate the radio resources to the transmitting device 110 for a constant time by a resource request of the transmitting device 110. As another example, the radio node 150 may specify a pool of radio resources that can be used for the purpose of communication between the transmitting device 110 and the receiving device 130, and may inform the transmitting device 110 and the receiving device 130 of the allocated radio resources.

The server 170 provides the video data or the video-related data to the transmitting device 110, the receiving device 130, or the radio node 150.

The broadcast device 190 may refer to the station that currently broadcasts digital sky waves, and may transmit broadcast content to the transmitting device 110 through a separate output device, such as a radio antenna or a coaxial cable.

The communication system, according to an embodiment of the present disclosure, may include other entities that constitute the network, as well as the devices shown in FIG. 1. For example, in the case of a broadband communication system, the communication system may include at least one of: a mobility management entity (MME) for supporting the mobility; a serving gateway that plays the role of connecting the transmitting device 110 and the receiving device 130 to an external network; a packet gateway that connects the serving gateway to an internet protocol (IP) network, such as an application server; a home subscriber server (HSS) that manages subscriber profiles for the transmitting device 110 and the receiving device 130 and provides the same to the MME; or a node that creates and manages a policy for the mobile communication services and a billing rule thereof between the packet gateway and the IP network. The node that serves for the billing may manage the billing for data in the D2D communication.

In addition, in the case of a Wi-Fi communication system that uses a non-licensed band, the communication system may include at least one of an AP for managing the radio resources, a Bluetooth device, or a node that has various types of radio access technologies.

Hereinafter, an example in which the transmitting device 110 transmits the video-related data to the receiving device 130 in the communication system, according to the embodiment of the present disclosure, will be described.

FIGS. 2A to 2D are views illustrating examples of a method of transmitting a video-related data by a transmitting device of a communication system, according to an embodiment of the present disclosure. Although the embodiments of FIGS. 2A to 2D show that the communication system includes two receiving devices 130-1 and 130-2, the embodiment of the present disclosure may be applied to all of the communication systems that include one or more receiving devices.

Figure 2A:
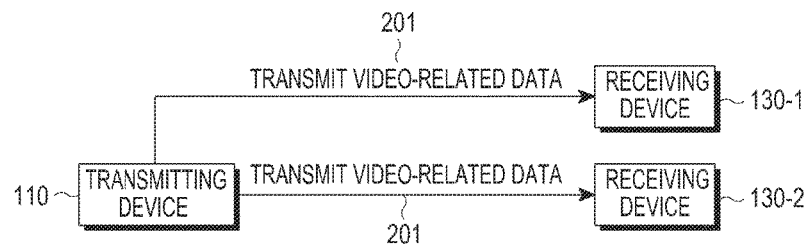
FIGS. 2A, 2B, 2C, and 2D are views illustrating examples of a method for transmitting video-related data in a transmitting device of a communication system, according to an embodiment of the present disclosure.

Referring to FIG. 2A, the transmitting device 110 may directly transmit the same video-related data to each of a plurality of receiving devices 130-1 and 130-2 (201). For example, the transmitting device 110 may directly transmit the video-related data to each of the plurality of receiving devices 130-1 and 130-2 by using Wi-Fi-direct communication or Bluetooth (BT) communication. As another example, the transmitting device 110 may directly transmit the video-related data to each of the plurality of receiving devices 130-1 and 130-2 by adopting a Wi-Fi-AP function or by using long term evolution (LTE)-D2D communication.

Figure 2B:
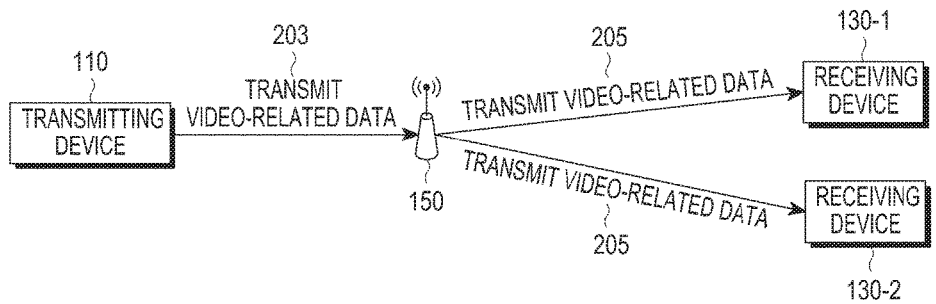

Referring to FIG. 2B, the transmitting device 110 may transmit the video-related data to each of the plurality of receiving devices 130-1 and 130-2 through the radio node 150. That is, when the radio node 150 receives the video-related data from the transmitting device 110 (203), the radio node 150 may transmit the video-related data to each of the plurality of receiving devices 130-1 and 130-2 (205).

Here, the radio node 150 may be a radio access point (AP) in various forms. For example, the radio node 150 may be an AP of Wi-Fi, a Bluetooth device, or a base station in a broadband radio transmission system. In addition, the radio node 150 may have a single, or a plurality, of radio access technologies (RATs). In the case where the radio node 150 has a plurality of RATs, and for example, in the case where the radio node 150 has an LTE communication system and a Wi-Fi communication system, the transmitting device 110 and the radio node 150 may transmit and receive the video-related data therebetween by using LTE technology, and the radio node 150 and the receiving device 130 may transmit and receive the video-related data therebetween by using Wi-Fi technology.

Figure 2C:
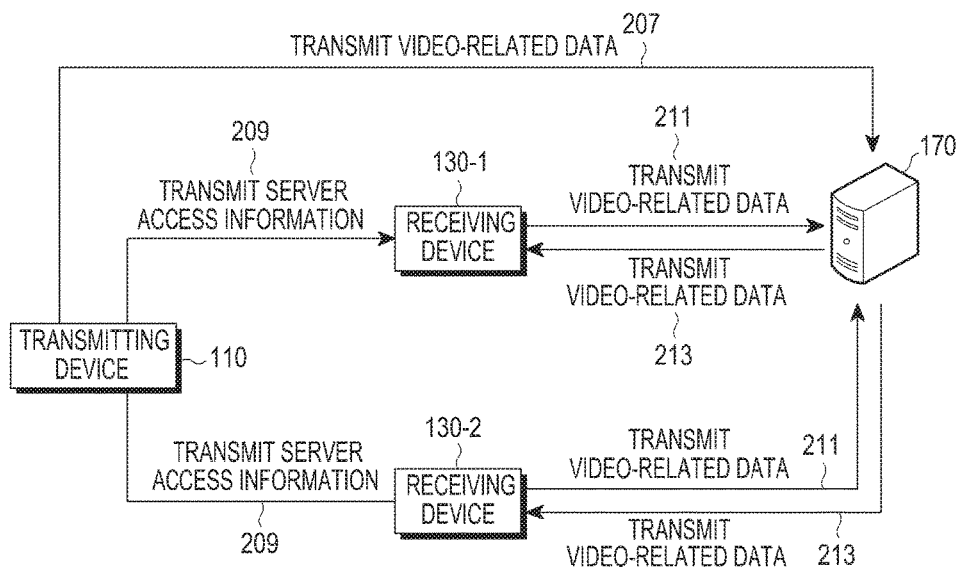

Referring to FIG. 2C, the transmitting device 110 may directly communicate with a plurality of receiving devices 130-1 and 130-2 through a server 170. That is, the transmitting device 110 transmits the video-related data to the server 170 (207). In addition, the transmitting device 110 transmits, to each of the plurality of receiving devices 130-1 and 130-2, server access information (for example, the IP address) of the server 170 that provides the video-related data (209). Then, each of the plurality of receiving devices 130-1 and 130-2 makes a request to the server 170 for the video-related data (211) and receives the video-related data from the server 170 (213). At this time, the server 170 may transmit the video-related data to at least one of the plurality of receiving devices 130-1 and 130-2 by using a unicast, or a broadcast, method.

Figure 2D:
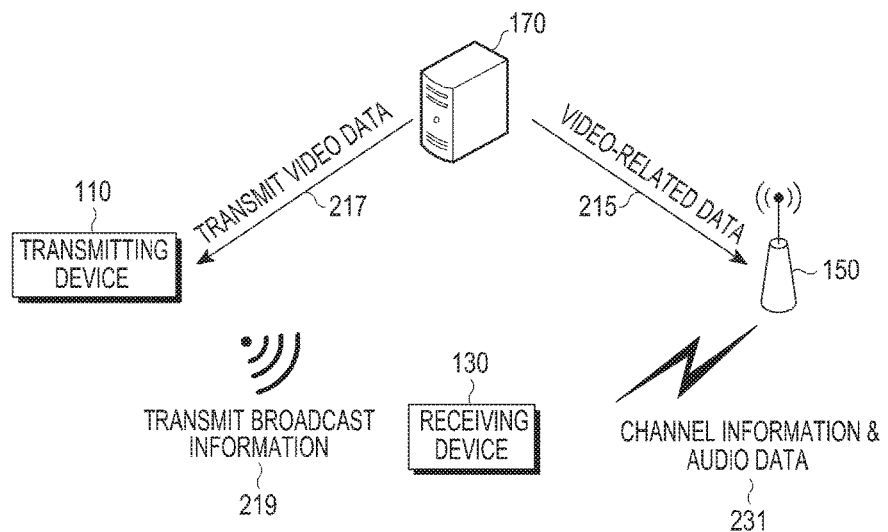

Referring to FIG. 2D, the server 170 transmits the video-related data to the radio node 150 (215) and transmits the video data to the transmitting device 110 (217). In addition, the receiving device 130 receives the video-related data from the radio node 150 (231). At this time, the video-related data may contain channel information and audio data (231). In addition, the transmitting device 110 may transmit broadcast information 219 to the receiving device 231.

Here, the receiving device 130 may communicate with the transmitting device 110 by using the same communication technology as the communication technology between the receiving device 130 and the radio node 150, or the receiving device 130 may have a plurality of radio access systems so that the communication technology between the receiving device 130 and the transmitting device 110 may be different from the communication technology between the receiving device 130 and the radio node 150. For example, the receiving device 130 may receive broadcast information from the transmitting device 110 by using LTE technology, and may receive the video-related data from the radio node 150 by using Wi-Fi technology.

In order to select a piece of video information, the transmitting device 110, according to the embodiment of the present disclosure, is to transmit video information to the receiving device 130 before, or at the same time, the video-related data is transmitted. That is, the transmitting device 110 may transmit the video information (that is, broadcast information) to the receiving device 130, and if a piece of video information is selected by the receiving device 130, the transmitting device 110 may identify video content corresponding to the selected video information.

Here, the video information may contain the title of a video that is currently output, or is available, from the transmitting device 110, the broadcast channel (for example, MBC, KBS, SBS, etc.) and the broadcast title (for example, "Infinite Challenge") in the case of the broadcast, or a unique ID of the transmitting device 110. In addition, the receiving device 130 receives the video information from the transmitting device 110 in order to thereby output the same through the video output unit. When a selection event for selecting a piece of video information occurs based on the video information, the receiving device 150 transfers the selected video information to the transmitting device 110. According to this, the receiving device 150 may receive video-related data (e.g., sounds, subtitles, advertisements, or the like) of the video content corresponding to the selected video information in order to thereby output the same.

Here, the transmitting device 110 may transmit the video information to the receiving device 150, as described below.

First, the transmitting device 110 may insert the video information into the front portion of the video-related data to then be transmitted to the receiving device 130. In this case, when the video-related data is received, the receiving device 130 may decode only the video information first, which has been inserted into the front portion of the video-related data, instead of decoding all pieces of the received data, to then output the same through the video output unit. For example, the transmitting device may insert the video information into the front portion of the video-related data to then be transmitted to the receiving device 130 in FIGS. 2A and 2B.

Second, the transmitting device 110 may transmit the video information to the receiving device 130 by using a broadcast packet of the radio node including a radio node function. For example, in the case where the transmitting device 110 adopts a Wi-Fi AP function, a master function of Bluetooth (BT), or a BT function, the transmitting device 110 may add the video information to the broadcast packet of the radio node in order to thereby transmit the same to the receiving device 130.

For example, in the case where the transmitting device 110 adopts a Wi-Fi AP function, the transmitting device 110 may insert the video information into a service set identifier (SSID) field that is contained in a beacon packet, as a broadcast packet, and may transmit the same to the receiving device 130. Alternatively, in the case where the transmitting device 110 adopts a master function of BT in which device information is broadcast for the pairing, the device information may be replaced with the video information to then be transmitted to the receiving device 130. Alternatively, in the case where the transmitting device 110 adopts a BT function, the transmitting device 110 may include the video information in a BT signal to then be transmitted to the receiving device. That is, in FIG. 2A, the transmitting device 110 may transmit the video information first by means of a beacon frame through a broadcast channel, or may transmit the video information first through a Bluetooth paring message or a Bluetooth signal, and may then transmit the video-related data to the receiving device 130 through a data channel. Alternatively, in FIG. 2C, the transmitting device 110 may transmit the video information first by means of a beacon frame through a broadcast channel, or may transmit the video information first through a Bluetooth paring message or a Bluetooth signal, and may then transmit the video-related data to the receiving device 130 through the server 170.

Figure 3:
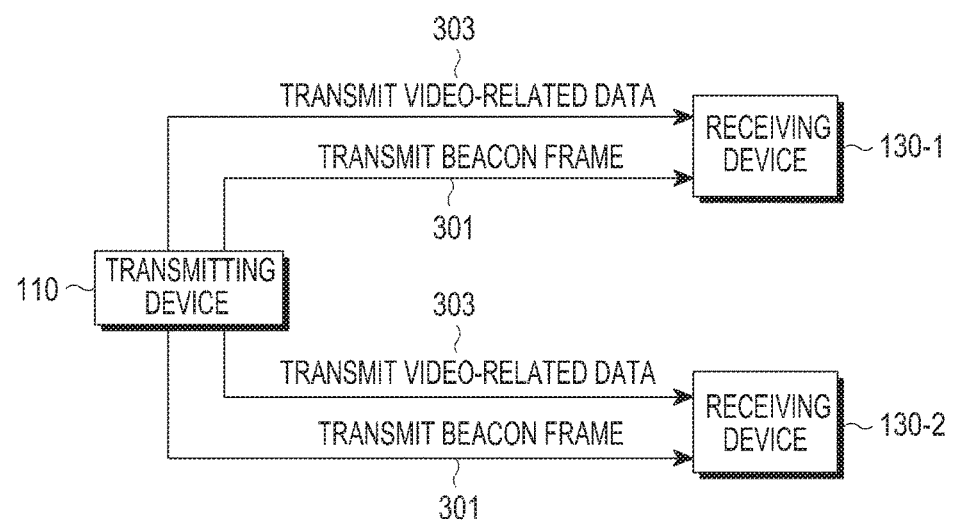
FIG. 3 is a view illustrating an example in which a transmitting device 110 of a communication system transmits a beacon frame, according to an embodiment of the present disclosure.

The operation of the transmitting device 110 that transmits a beacon frame may be performed as shown in FIG. 3.

FIG. 3 illustrates an example in which the transmitting device 110 of the communication system transmits a beacon frame, according to an embodiment of the present disclosure.

Referring to FIG. 3, in a case where the transmitting device 110 adopts a Wi-Fi AP function, the transmitting device 110 may transmit video information by using a beacon frame, and may then transmit the video-related data. The transmitting device 110 transmits, to each of a plurality of receiving devices 130-1 and 130-2, a beacon frame that contains video information or device information in the SSID field (301). In addition, the transmitting device 110 transmits the video-related data to each of the plurality of receiving devices 130-1 and 130-2 (303). Then, each of the plurality of receiving devices 130-1 and 130-2 may obtain, from the beacon frame, the video information that can be output in the transmitting device 110.

A method of transmitting data through the radio node 150 in the embodiment of the present disclosure will be described with reference to FIG. 2B. In FIG. 2B, first, the transmitting device 110 establishes a communication link with the radio node 150. For example, if the radio node 150 is a Wi-Fi AP, the transmitting device 110 identifies, from the beacon frame, information that is required to connect to the radio node 150 and comes into the communicable state with the radio node 150. Alternatively, if the radio node 150 is Bluetooth, the radio node 150 performs a master function, and the transmitting device 110 performs a slave function. At this time, the transmitting device 110 performs a pairing with the radio node 150 through pairing information that is broadcast by the radio node 150.

The following description will be made of a method of transmitting the video-related data through the radio node 150 after the transmitting device 110 completes the connection with the radio node 150. The transmitting device 110 records and transmits, to the radio node 150, the reception address that can be locally forwarded. For example, in the case where the radio node 150 is Wi-Fi, the transmitting device 110 records the destination address of the MAC address, as the broadcast address, to then transmit the same. Then, the radio node 150 recognizes that the destination address is the broadcast address by identifying the MAC address, and broadcasts the received video-related data within the area of the radio node 150 without further forwarding the data through the external Internet network. To this end, the transmitting device 110, the radio node 150, and the receiving device 130 are to agree with a definition of the broadcast address. In the case where the radio node 150 is Bluetooth (BT), when the transmitting device 110 transmits, as a slave, the video-related data to the radio node 150 as a master, the radio node 150 transmits the video-related data to other receiving devices of slaves that are paired with the radio node 150 by a unicast, or a broadcast, method.

A method of transmitting data through the server 170 as shown in FIG. 2C in the embodiment of the present disclosure will be described as follows. The transmitting device 110 of FIG. 2C transmits, to the receiving devices 130-1 and 130-2, information that is necessary to access the server 170. For example, in the case where the transmitting device 110 adopts a Wi-Fi AP function, the transmitting device 110 may insert the information (for example, the file address on the Internet (uniform resource locator: URL)) to access the server 170, as well as the broadcast information, into the SSID field of a beacon frame, and may transmit the same to the receiving device 130. Alternatively, the information to access the server may be provided in the receiving device 130 in advance. Thus, the receiving device 130 may receive the beacon frame (300), and may then access the server 170 in order to thereby receive the video-related data if the receiving device 130 desires to receive the corresponding video-related data. As another example, in the case where the transmitting device 110 adopts a Bluetooth (BT) function, the broadcast information and the information (e.g., the URL) to access the server 170 may be included in the unique user identifier (UUID) of Bluetooth paring information.

A method of transmitting data through the server 170 as shown in FIG. 2D in the embodiment of the present disclosure will be described below. The embodiment of FIG. 2D shows an example in which data is transmitted through the server 170 when the server 170 has a video and video-related data, wherein the server 170, the transmitting device 110, the radio node 150, and the receiving device 130 may operate in the same manner as that of FIG. 4.

Figure 4:
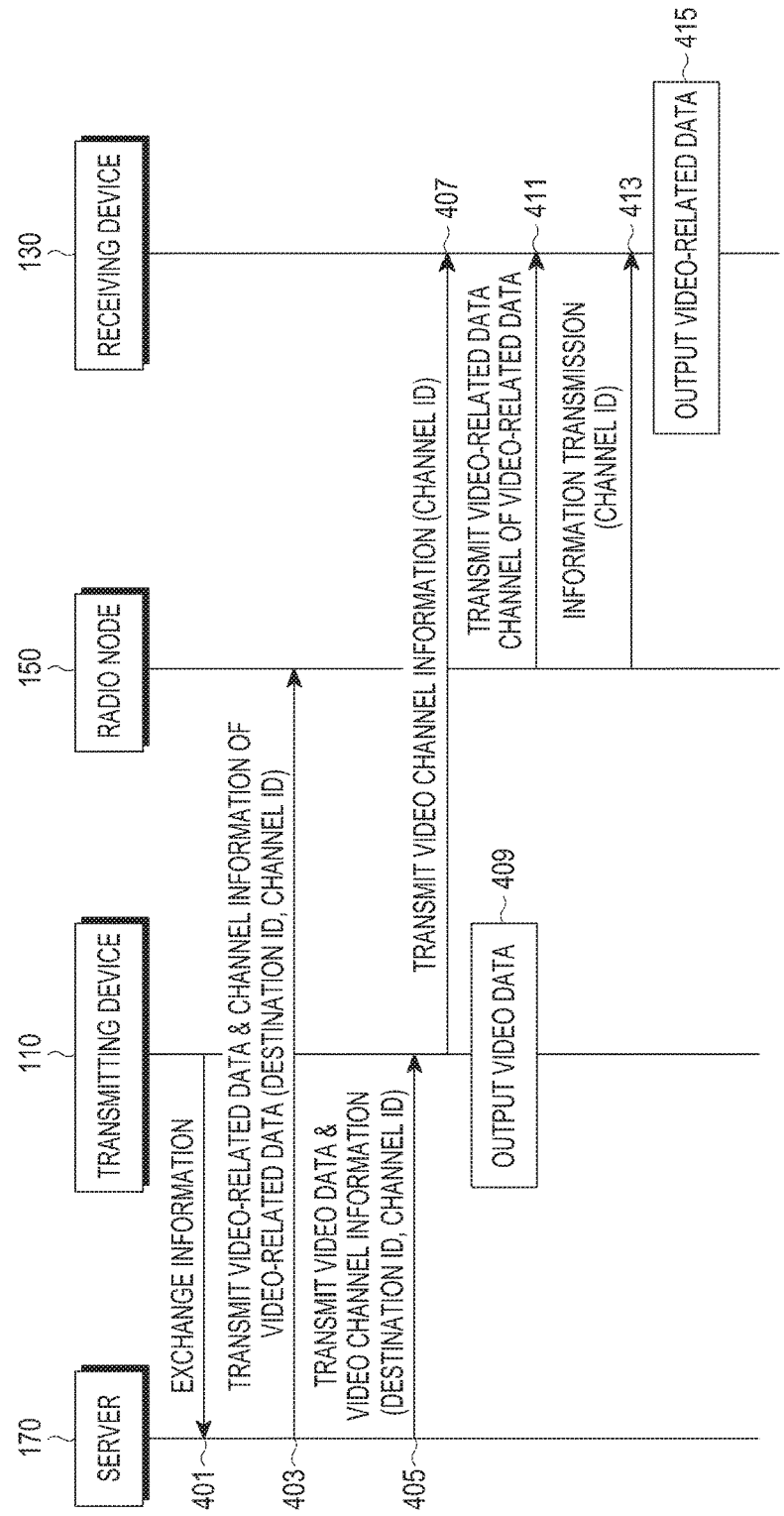
FIG. 4 is a view illustrating an example in which a receiving device receives data through a server in a communication system, according to an embodiment of the present disclosure.

FIG. 4 is a view illustrating an example in which a receiving device receives data through a server in a communication system, according to the embodiment of the present disclosure.

Referring to FIG. 4, the server 170 transmits video data and video-related data, as in the embodiment of FIG. 2D. Thus, the transmitting device 110 makes a request to the server 170 for the exchange of information (401). Then, the server 170 transmits the video-related data and channel information of the video-related data (403) (e.g., name information of the video content or the name of the transmitting device 110) to the radio node 150, and transmits the video data and channel information of the video data to the transmitting device 110 (405). At this time, the server 170 may recognize, through a destination ID (e.g., a unique ID or IP address of the destination), the address of the transmitting device 110 that is the destination of the video data to be transmitted, and may then transmit the video data to the transmitting device 110. In addition, the server 170 may obtain the device name of the transmitting device 110 through communication prior to the data transmission with the transmitting device 110. In addition, the channel information of the video-related data, which is transmitted from the server 170 to the radio node 150, may be the same as the channel information of the video data, which is transmitted from the server 170 to the transmitting device 110.

When the channel information of the video data and the video data are received, the transmitting device 110 transmits the channel information of the video data to the receiving device 130 (407) and outputs the video data (409).

Afterwards, the radio node 150 transmits, to the receiving device 130, the received video-related data and the channel information of the video-related data (411, 413).

Thus, the receiving device 130 may output the video-related data (e.g., audio data) that is related to the video data that is being output in the transmitting device 110 based on the received video-related data and the received channel information of the video-related data (415).

Therefore, the user who uses the transmitting device 110 and the receiving device 130, according to the embodiment of the present disclosure, may view the video data through the transmitting device 110, and may be provided with audio data corresponding to the video data that the user is viewing through the receiving device 130.

Figure 5A:
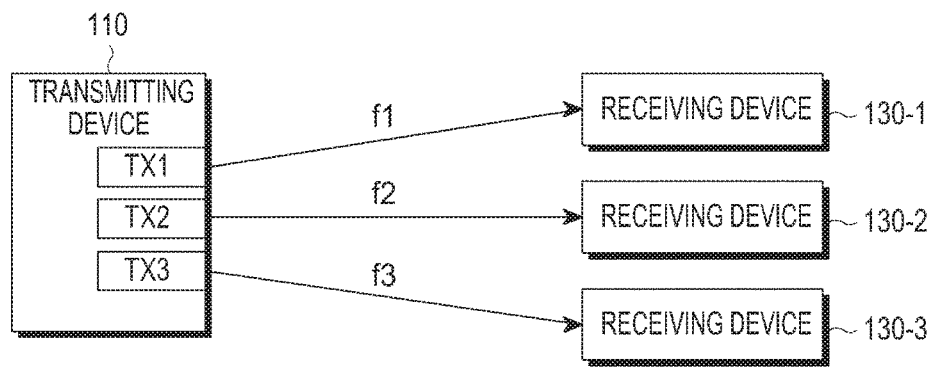
FIGS. 5A and 5B are views illustrating an example in which a transmitting device transmits data when a communication system includes a plurality of receiving devices, according to an embodiment of the present disclosure.
Figure 5B:
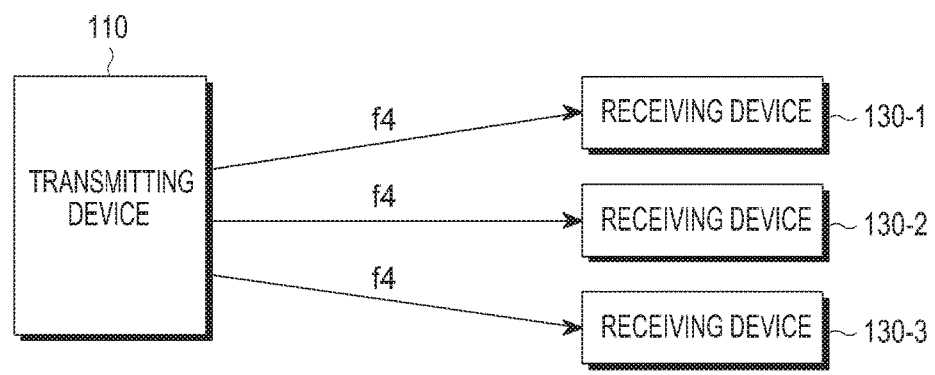

FIGS. 5A and 5B illustrate an example in which a transmitting device transmits data when a communication system includes a plurality of receiving devices, according to an embodiment of the present disclosure. Although FIGS. 5A and 5B show an example in which the communication system includes three receiving devices 130-1, 130-2, and 130-3, the embodiments of the present disclosure may be applied to all of the communication systems that include two or more receiving devices.

Referring to FIG. 5A, the transmitting device 110 may transmit the video-related data to each of a plurality of receiving devices 130-1 to 130-3 by using different frequencies. That is, the transmitting device 110 may: transmit the video-related data to the receiving device 130-1 by using a frequency of f1; transmit the video-related data to the receiving device 130-2 by using a frequency of f2; and transmit the video-related data to the receiving device 130-3 by using a frequency of f3. At this time, the transmitting device 110 may be provided with three transmission blocks for transmitting the same video-related data to different receiving devices.

Referring to FIG. 5B, the transmitting device 110 may transmit the video-related data to each of a plurality of receiving devices 130-1, 130-2, and 130-3 by using a single frequency. That is, the transmitting device 110 may determine a single frequency (f4) for transmitting the video-related data to each of the plurality of receiving devices 130-1 to 130-3, and may transmit the video-related data to each of the plurality of receiving devices 130-1 to 130-3 by using the determined frequency. For example, in the case of an LTE-D2D communication system, the transmitting device 110 may transmit the video-related data to different receiving devices by using a common frequency for transmitting disaster information (for public safety).

Figure 6:
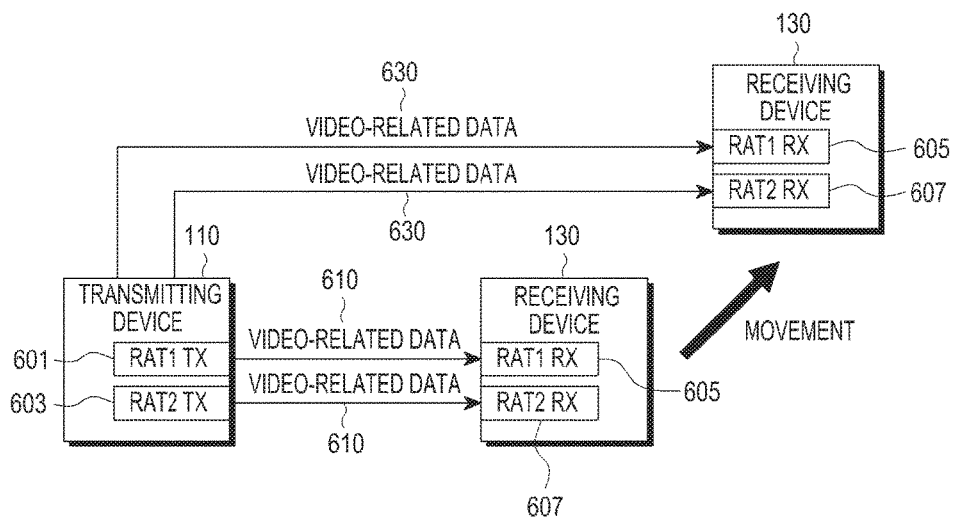
FIG. 6 is a view illustrating an example in which data is transmitted when transmitting/receiving devices include a plurality of radio access technologies (RATs) in a communication system, according to an embodiment of the present disclosure.

FIG. 6 illustrates an example in which data is transmitted when transmitting/receiving devices include a plurality of radio access technologies (RATs) in a communication system, according to the embodiment of the present disclosure. Although FIG. 6 shows that the transmitting device 110 and the receiving device 130 include two RATs, respectively, the embodiment of the present disclosure may be applied to all of the communication systems that include two or more RATs. Here, each of a plurality of RATs may be a variety of wireless communication systems, such as a broadband communication system, a Wi-Fi system, or a Bluetooth (BT) system. For example, one RAT included in the transmitting device 110 may be a Wi-Fi communication system, and the other RAT may be an LTE communication system.

Meanwhile, although it is not shown in the drawing, each of the transmitting device 110 and the receiving device 130 may include a plurality of radio frequency (RF) units instead of a plurality of RATs. For example, the plurality of RF units may be comprised of a unit that is able to transmit and receive a frequency of 2.4 GHz and a unit that is able to transmit and receive a frequency of 5 GHz.

Referring to FIG. 6, the transmitting device 110 includes the first RAT transmitting unit 601 and the second RAT transmitting unit 603, and the receiving device 130 includes the first RAT receiving unit 605 and the second RAT receiving unit 607.

The transmitting device 110 may transmit the video-related data through the first RAT transmitting unit 601 and the second RAT transmitting unit 603, respectively (610 and 630). In addition, the receiving device 130 selects one of the first RAT transmitting unit 601 or the second RAT transmitting unit 603 in order to thereby receive the video-related data. The receiving device 130 may select one RAT transmitting unit in various manners, such as the intensity of a signal or a user's selection. For example, if the intensity of a signal transmitted from the second RAT transmitting unit 603 is greater than the intensity of a signal transmitted from the first RAT transmitting unit 601, the receiving device 130 receives the video-related data that is transmitted from the second RAT transmitting unit 603. Afterwards, if the intensity of a signal transmitted from the second RAT transmitting unit 603 is less than the intensity of a signal transmitted from the first RAT transmitting unit 601 because of the movement of the receiving device 130, the receiving device 130 may receive the video-related data that is transmitted from the first RAT transmitting unit 301.

Figure 7:
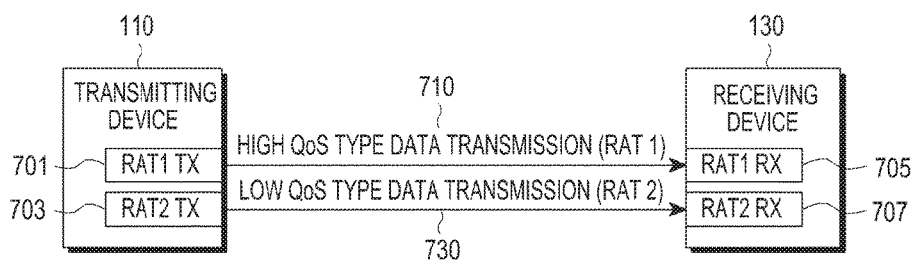
FIG. 7 is a view illustrating another example in which data is transmitted when transmitting/receiving devices include a plurality of RATs in a communication system, according to an embodiment of the present disclosure.

FIG. 7 is a view illustrating another example in which data is transmitted when transmitting/receiving devices include a plurality of RATs in a communication system, according to an embodiment of the present disclosure.

Referring to FIG. 7, the transmitting device 110 includes the first RAT transmitting unit 701 and the second RAT transmitting unit 703, and the receiving device 130 includes the first RAT receiving unit 705 and the second RAT receiving unit 707. At this time, the first RAT transmitting unit 701 included in the transmitting device 110 may transmit video-related data that has a higher quality of service (QoS) than a constant threshold value (710), and the second RAT transmitting unit 703 may transmit video-related data that has a lower quality of service (QoS) than a constant threshold value (730). In addition, the receiving device 130 may receive the video-related data having a high QoS and the video-related data having a low QoS by using the first RAT receiving unit 705 and the second RAT receiving unit 707.

The transmitting device 110 that operates as described in the embodiment above, for example, may be a terminal that is able to output videos, such as a digital signage or a media pole. In addition, the transmitting device 110 determines the priority according to the type of data that is contained in the video-related data, and may select the RAT transmitting unit for transmitting the data according to the determined priority. For example, if the video-related data contains audio data, the transmitting device 110 may give the highest priority to the audio data among the data to be transmitted, and if the video-related data contains text data, the transmitting device 110 may give, to the text data, the lower priority than the audio data. Therefore, the transmitting device 110 may select an RAT for transmitting the audio data and the text data based on the determined priority. For example, if the transmitting device 110 determines that the highest priority data is to be transmitted by using an LTE communication system, the transmitting device 110 selects, as the RAT for transmitting the audio data, the first RAT transmitting unit 701 that corresponds to the LTE communication system. Then, the transmitting device 110 selects the first RAT transmitting unit 701 as the RAT for transmitting the audio data and transmits the audio data through the first RAT transmitting unit 701.

In addition, if the receiving device 130 determines that the highest priority data is the audio data in the video-related data to be received and determines the highest priority data is to be transmitted by using an LTE communication system, the receiving device 130 may select the second RAT receiving unit 707 as the RAT for receiving the audio data, and may receive the audio data through the second RAT receiving unit 707 selected.

The embodiments above have described that the transmitting device 110 separates the video data and the video-related data from the video content and transmits the video-related data to the receiving device 130 according to the environment of the communication system with reference to FIGS. 1, 2A, 2B, 2C, 2D, 3, 4, 5A, 5B, 6, and 7. Hereinafter, a method of actually transmitting and receiving data by the transmitting device 110 and the receiving device 130 in the communication system, according to the embodiment of the present disclosure, will be described. In the following description, it is assumed that the transmitting device 110 has transmitted video information to the receiving device 130 and the receiving device 130 has already selected one piece of video information to be received. In addition, although the video-related data may contain at least one piece of audio data, text data, or image data, hereinafter, it is assumed that the video-related data is the audio data.

Figure 8:
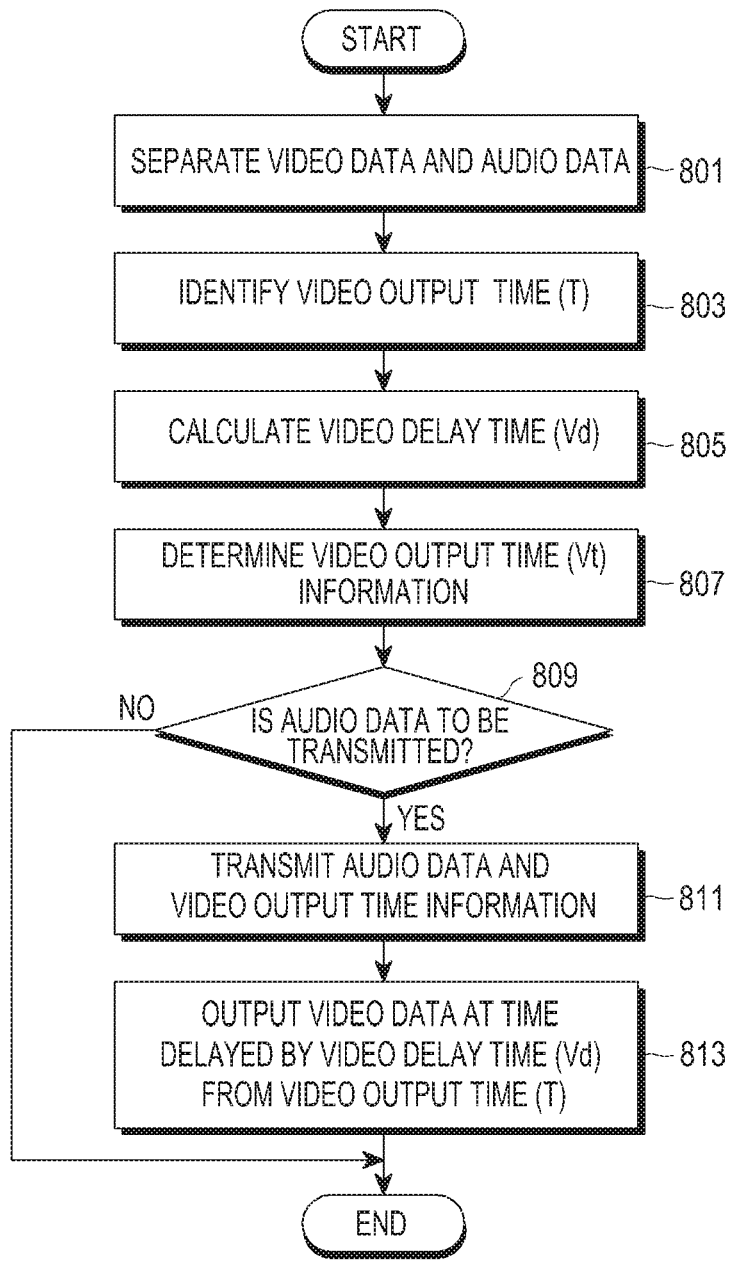
FIG. 8 is a view illustrating a method for transmitting data in a transmitting device of a communication system, according to an embodiment of the present disclosure.

FIG. 8 shows a method for transmitting data in a transmitting device of a communication system, according to an embodiment of the present disclosure.

Referring to FIG. 8, the transmitting device 110 separates video container data for outputting a video into video data and audio data (801). For example, in the case where the video data is audio video interleaving (AVI) data, the AVI data may be separated into Video x264 corresponding to the video data and audio digital theatre Systems (DTS) corresponding to the audio data through the operation (801) of separating the video data and the audio data.

In addition, the transmitting device 110 identifies the time (T) to output the video data from the separated video data (803). The transmitting device 110 may calculate a video delay time (Vd) by considering at least one of the processing time for transmitting the audio data in the transmitting device 110, the scheduling time of allocating radio resources, or the processing time for outputting the audio data in the receiving device 130 prior to outputting the video data at the identified video output time (T) (805). Here, the scheduling time of allocating radio resources, for example, may be a contention time in the case of a Wi-Fi system, or may be a pairing time in the case of a Bluetooth system. Operation 805 is intended to more accurately synchronize the video data and the audio data, and may not be performed depending on the system situation.

In addition, the transmitting device 110 determines video output time (Vt) information by using the identified video output time (T) and the calculated video delay time (Vd) (807). Here, the video output time (Vt) information may be determined to be different according to whether the setting time of the transmitting device 110 and the receiving device 130 is an absolute time or a relative time. That is, when the transmitting device 110 and the receiving device case 130 use absolute time information (for example, the time that is received from satellites or an absolute time of the network), the transmitting device 110 determines the video output time (Vt) information that contains the time (T') that is delayed by the calculated video delay time (Vd) from the identified video output time (T). For example, in the case where the communication system is an LTE system, the transmitting device 110 and the receiving device 130 may synchronize the absolute time through coordinated universal time (UTC) information of the system information block (SIB) that is provided by a base station. On the contrary, in the case where the transmitting device 110 and the receiving device 130 use relative time information, the transmitting device 110 determines video output time (Vt) information that contains an effective time (Tn, Tm, or Tnm) of the video data output or a delayed relative time of the video data. Here, the effective time (Tn, Tm, or Tnm) may be: Tn that is a requirement at the minimum output time with respect to the absolute time (T') for outputting the video data; Tm that is a requirement at the maximum output time with respect to the absolute time (T') for outputting the video data; or Tnm that is the time between Tn and Tm. In addition, the relative time (margin time) may be the time when a video may be output by considering the video delay time (Vd) from the identified video output time (T).

The transmitting device 110 determines whether to transmit the audio data to the receiving device 130 by using the identified video output time (T) or the video output time (Vt) information (809). For example, the transmitting device 110 may determine that the audio data is not transmitted when the transmission time of the audio data is later than the video output time (T), and may determine that the audio data is transmitted when the transmission time of the audio data is earlier than the video output time (T). When the transmitting device 110 determines to transmit the audio data, the transmitting device 110 transmits the determined video output time (Vt) information and the separated audio data to the receiving device 130 (811). At this time, as described with reference to FIGS. 1 to 7, the transmitting device 110 may transmit, to the receiving device 130, the determined video output time (Vt) information and the separated audio data through other entities depending on the environment of the communication system. In addition, the transmitting device 110 may simultaneously, or separately, transmit the determined video output time (Vt) information and the separated audio data.

In addition, the transmitting device 110 outputs the video data at the time (T') that is delayed by the video delay time (Vd) from the video output time (T) (813).

Figure 9:
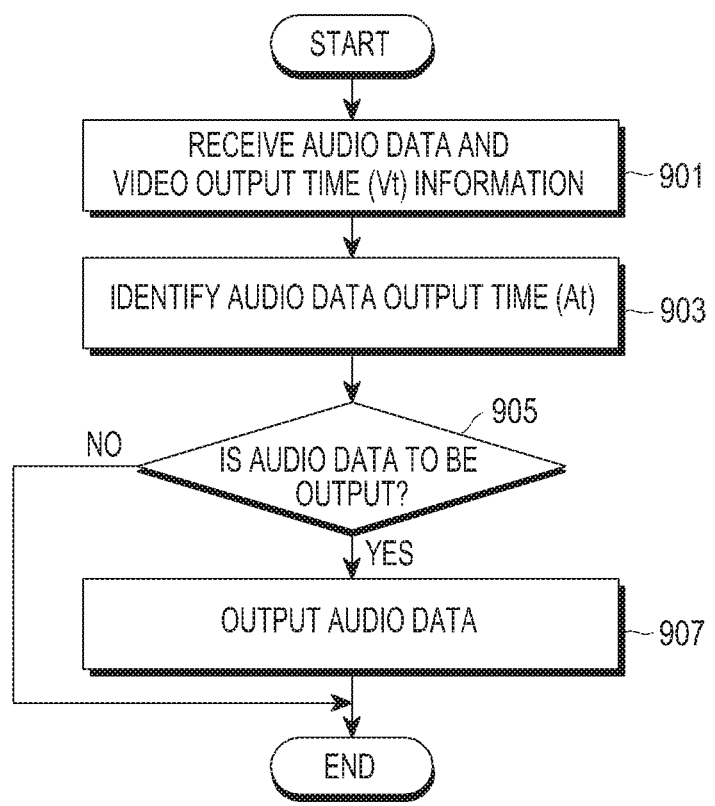
FIG. 9 is a view illustrating an example of a method in which a receiving device of the communication system receives data, according to an embodiment of the present disclosure.

FIG. 9 illustrates an example of a method in which a receiving device of a communication system receives data, according to an embodiment of the present disclosure. The embodiment of FIG. 9 relates to a method of outputting audio data in the receiving device 130 in the case where the transmitting device 110 and the receiving device 130 use an absolute time on the assumption that the transmitting device 110 and the receiving device 130 are synchronized with each other for the absolute time.

Referring to FIG. 9, the receiving device 130 receives, from the transmitting device 110, audio data and video output time (Vt) information separately or simultaneously (901). Here, the video output time (Vt) information contains the time (T') when the video data is output.

In addition, the receiving device 130 identifies, from the received audio data, the audio data output time (At) when the audio data is to be output (903). The receiving device 130 determines whether or not to output the audio data based on the video output time (Vt) information and the audio data output time (At) (905). For example, the receiving device 130 may determine to output the audio data if the difference between the audio data output time (At) and the video output time (Vt) information is less than a predetermined threshold value. Here, the predetermined threshold value may be the maximum time interval in which the user recognizes that the video data and the audio data are synchronized with each other.

When the receiving device 130 determines to output the audio data, the receiving device 130 outputs the received audio data at the audio data output time (At) (907), and when the receiving device 130 determines not to output the audio data, the receiving device 130 removes the audio data.

Figure 10:
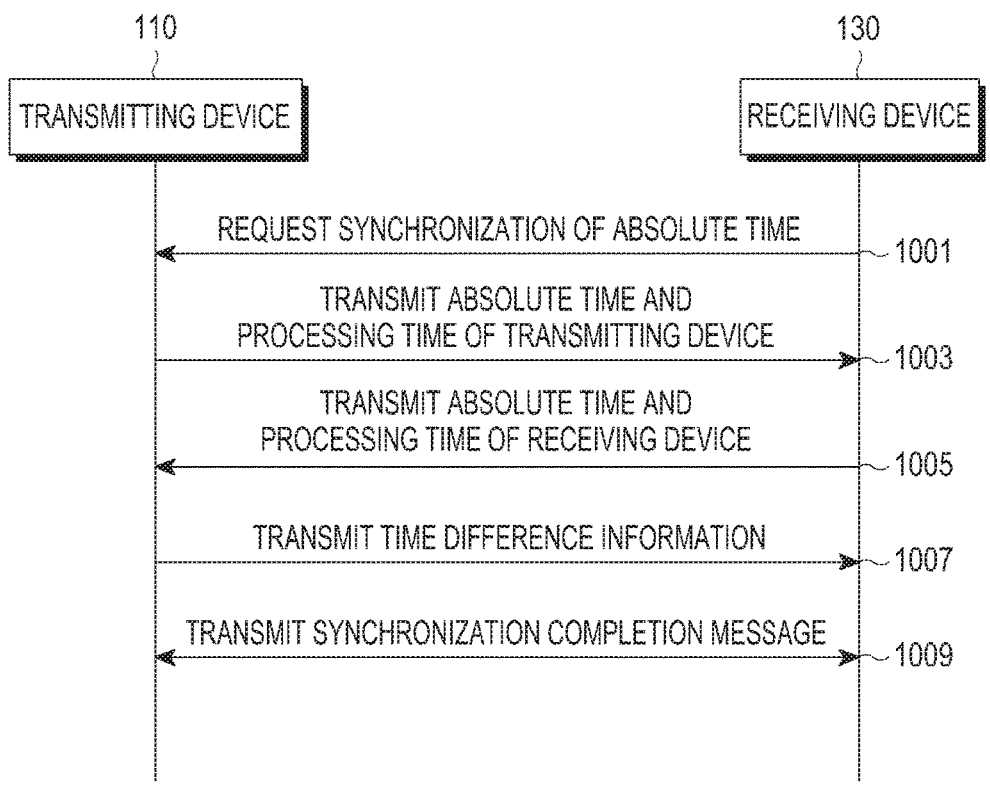
FIG. 10 is a view illustrating an example of a method of synchronizing absolute time between a transmitting device and a receiving device of a communication system, according to an embodiment of the present disclosure.

Meanwhile, in the case where the transmitting device 110 and the receiving device 130 are not synchronized with each other for the absolute time, the transmitting device 110 and the receiving device 130 may synchronize the absolute time between them by using the method of FIG. 10, and may then perform the operation of FIG. 9.

FIG. 10 illustrates an example of a method of synchronizing absolute time between a transmitting device and a receiving device of a communication system, according to an embodiment of the present disclosure.

Referring to FIG. 10, in order to match the absolute time with that of the transmitting device 110, the receiving device 130 transmits, to the transmitting device 110, a message for requesting the absolute time synchronization (1001). When the absolute time synchronization request message is received from the receiving device 130, the transmitting device 110 transmits, to the receiving device 130, the absolute time (T_atx) of the transmitting device 110 corresponding to the time when the absolute time synchronization request message is received and the processing time (T_dtx) of the transmitting device 110 (1003). In addition, the receiving device 130 corrects the absolute time of the receiving device by using the absolute time (T_atx) of the transmitting device 110 and the processing time (T_dtx) of the transmitting device 110, and transmits the corrected absolute time (T_crx) of the receiving device to the transmitting device 110 (1005).

Thereafter, the transmitting device 110 calculates the time difference (T_d) of the absolute time between the transmitting device 110 and the receiving device 130 through the current absolute time (T_crx) of the receiving device 130 and the processing time (T_drx) of the receiving device 130. In addition, if the calculated time difference (T_d) is not within a constant duration, the transmitting device 110 may transmit and receive, to and from the receiving device 130, the time difference (T_d) information of the transmitting device 110 and the receiving device 130, and the absolute time information (T_ctx or T_crx) a constant number of times (1007). For example, the transmitting device 110 may correct the difference between the current absolute time (T_crx) of the receiving device 130 and the current absolute time (T_ctx) of the transmitting device 110, and the processing time (T_drx) of the receiving device 130 in order to thereby calculate the difference (T_d) of the absolute time between the receiving device 130 and the transmitting device 110.

In addition, if the calculated time difference (T_d) is within a constant duration, the transmitting device 110 or the receiving device 130 transmits a synchronization completion message (1009).

Figure 11:
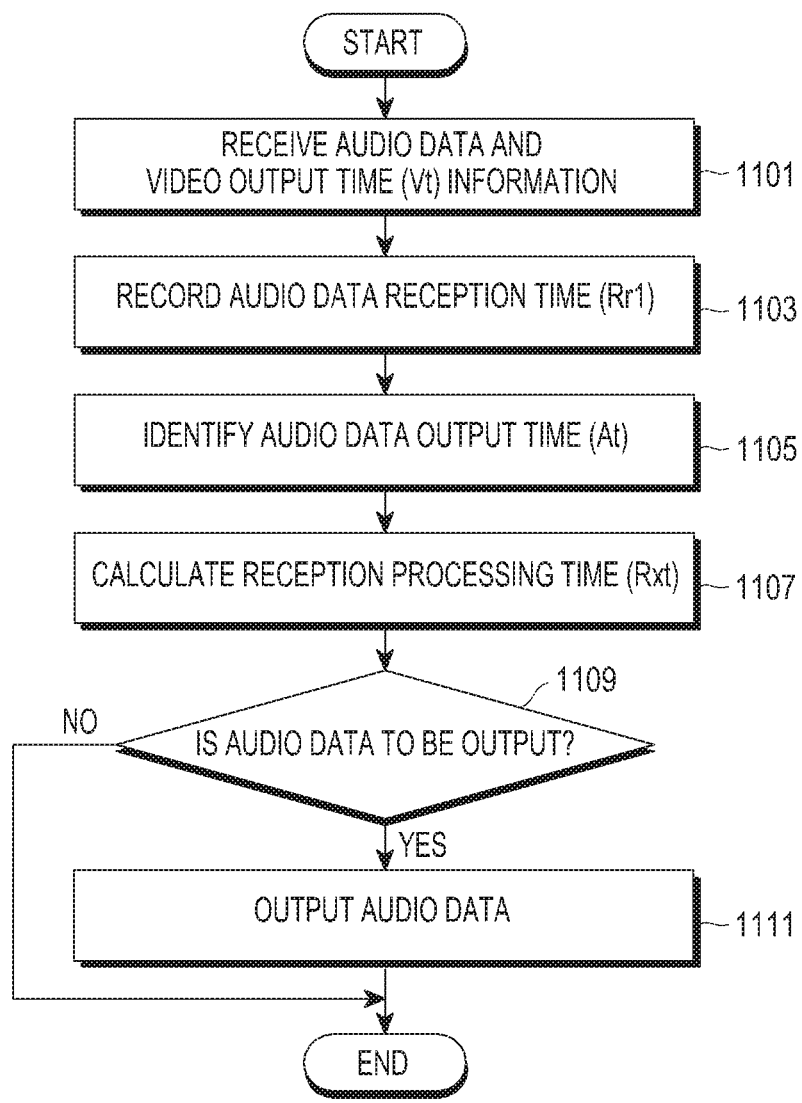
FIG. 11 is a view illustrating another example of a method in which a receiving device of a communication system receives data, according to an embodiment of the present disclosure.

FIG. 11 illustrates another example of a method in which a receiving device of a communication system receives data, according to an embodiment of the present disclosure. The embodiment of FIG. 11 relates to a method of outputting audio data in the receiving device 130 when the transmitting device 110 and the receiving device 130 use a relative time.

Referring to FIG. 11, the receiving device 130 receives, from the transmitting device 110, audio data and video output time (Vt) information separately or simultaneously (1101). Here, the video output time (Vt) information contains an effective time (Tn, Tm, or Tnm) of the video data output or a delayed relative time of the video data. In addition, the receiving device 130 records the reception time (R1) when the audio data is received (1103). For example, the reception time recorded by the receiving device 130 may be the time when the audio data is received in the radio layer, or may be the time when the audio data is identified in the upper layer.

The receiving device 130 decodes the received audio data in order to thereby identify the audio data output time (At) when the audio data is output (1105). In addition, the receiving device 130 calculates the processing time (Rxt) of the receiving device 130 through the difference between the audio data output time (At) and the reception time (Rr1) when the audio data is received (1107). The receiving device 130 determines whether to output the audio data based on the calculated processing time (Rxt) of the receiving device 130 and the received video output time (Vt) information (1109). For example, the receiving device 130 may determine to output the audio data when the processing time (Rxt) of the receiving device 130 is less than the time contained in the received video output time (Vt) information, and may determine not to output the audio data when the processing time (Rxt) of the receiving device 130 is greater than the time contained in the received video output time (Vt) information. In addition, the receiving device 130 may determine to output the audio data after correcting the audio output time by using the margin time that is contained in the received video output time (Vt) information.

As an example of the correction, the receiving device compares the relative time of the transmitting device, which is contained in the video output time (Vt) information of the transmitting device with the processing time of the receiving device. If the processing time of the receiving device is earlier than the relative time of the transmitting device, the reproduction time of the receiving device may be earlier than the video reproduction time of the transmitting device. Accordingly, the receiving device adds the margin time transmitted by the transmitting device to the time difference between the relative time of the transmitting device and the processing time of the receiving device in order to thereby reproduce the sound.

When the receiving device 130 determines to output the audio data, the receiving device 130 outputs the received audio data at the audio data output time (At) or at the corrected audio data output time (1111), and when the receiving device 130 determines not to output the audio data, the receiving device 130 removes the audio data.

Some of the operations performed by the receiving device 130 described above with reference to FIGS. 9 and 11 may be performed by a relay device 1200 for relaying the transmitting device 110 and the receiving device 130. Here, the relay device 1200 may be at least one of the radio node 150 or the server 170 shown in FIGS. 2B to 2D.

In the case where the transmitting device 110 and the receiving device 130 use an absolute time as described in the embodiment of FIG. 9, the relay device 1200 may transfer the video data and video output time (Vt) information, which are received from the transmitting device 110, to the receiving device 130. In addition, in the case where the transmitting device 110 and the receiving device 130 use a relative time as described in the embodiment of FIG. 11, the relay device 1200 and the transmitting device 110 may operate in the same manner as the embodiments of FIGS. 12 and 13.

Figure 12:
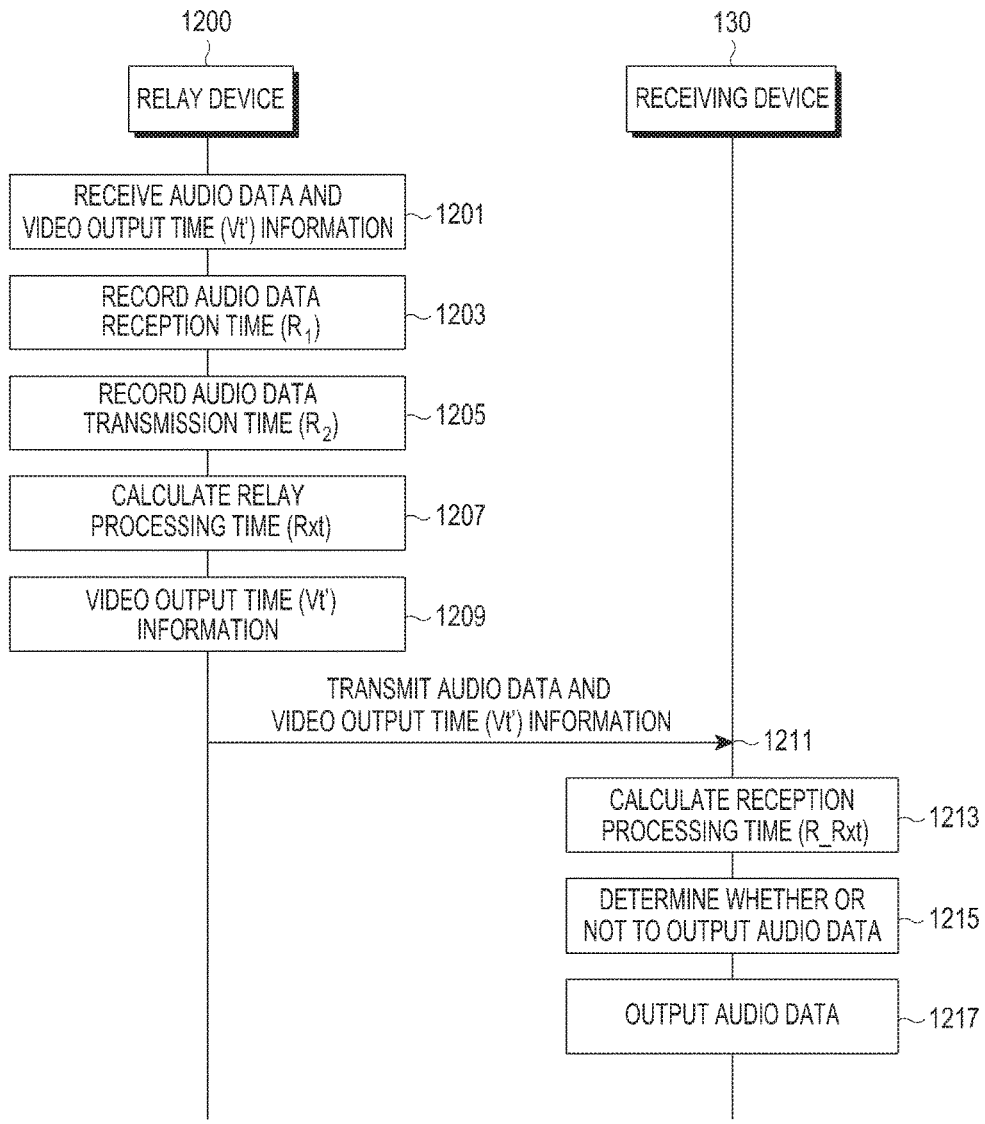
FIG. 12 is a view illustrating an example of a method in which a receiving device and a relay device of a communication system receive data, according to an embodiment of the present disclosure.

FIG. 12 illustrates an example of a method in which a receiving device and a relay device of a communication system receive data, according to an embodiment of the present disclosure. The embodiment of FIG. 12 relates to a method in which the relay device 1200 receives data from the transmitting device 110 and the receiving device 130 determines whether or not to output the audio data in the case where the transmitting device 110 and the receiving device 130 use a relative time.

Referring to FIG. 12, the relay device 1200 receives, from the transmitting device 110, audio data and video output time (Vt) information separately or simultaneously (1201). Here, the video output time (Vt) information contains an effective time (Tn, Tm, or Tnm) of the video data output or a delayed relative time of the video data.

In addition, the relay device 1200 records the time (R1) when the audio data is received (1203), and records the time (R2) when the audio data is transmitted to the receiving device 130 (1205).

The relay device 1200 may calculate the relay processing time (Rxt) by using the time (R1) when the audio data is received and the time (R2) when the audio data is transmitted to the receiving device 130 (1207). In addition, the relay device 1200 may calculate video output time (Vt') information by means of the remaining time that is obtained by subtracting the relay processing time (Rxt) from the received video output time (Vt) information (1209). Thus, the relay device 1200 transmits the calculated video output time (Vt') information and the audio data to the receiving device 130 (1211).

In addition, the receiving device 130 receives the audio data and the video output time (Vt') information from the relay device 1200 in order to thereby calculate the processing time (R_Rxt) of the receiving device 130 (1213). In addition, the receiving device 130 determines whether or not to output the audio data based on the calculated processing time (R_Rxt) of the receiving device 130 and the received video output time (Vt') information (1215). When the receiving device 130 determines to output the audio data, the receiving device 130 outputs the received audio data at the audio data output time (At) or at the corrected audio data output time (1217), and when the receiving device 130 determines not to output the audio data, the receiving device 130 removes the audio data.

Figure 13:
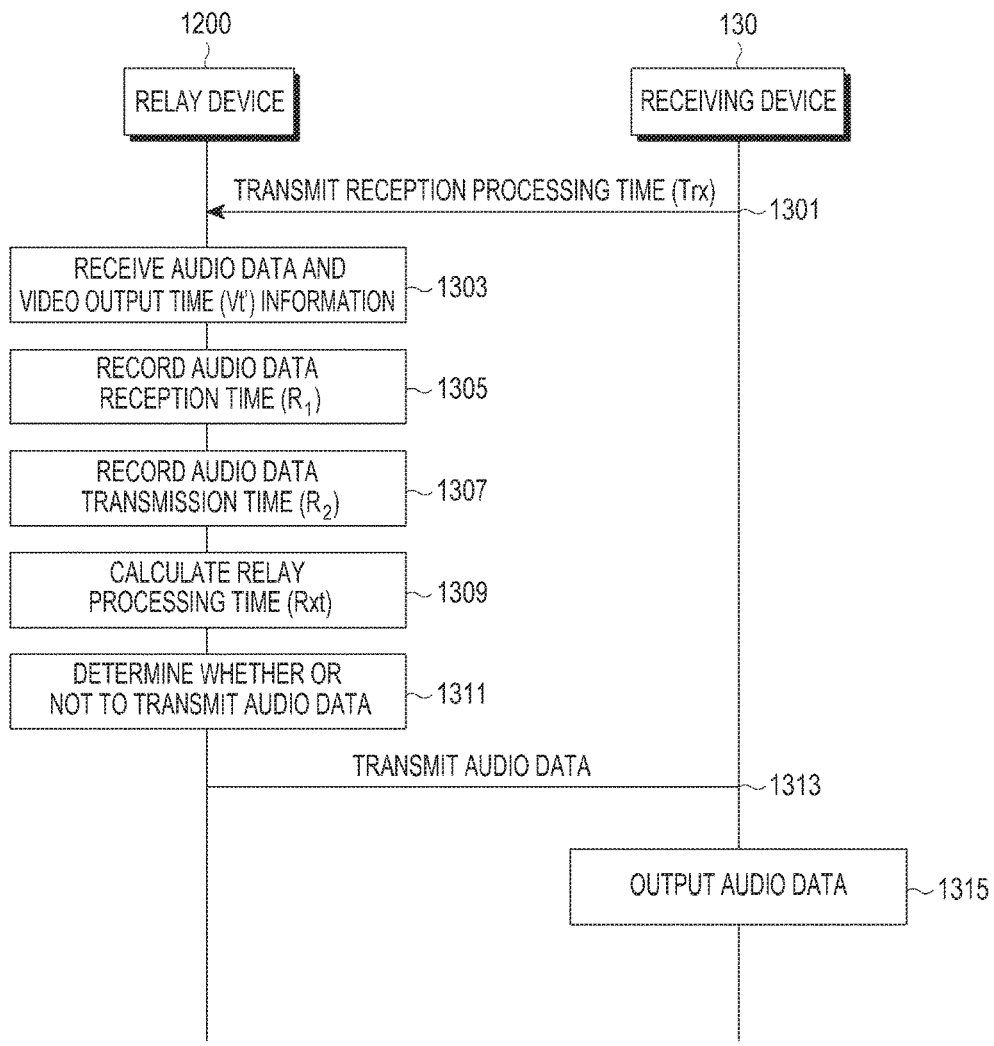
FIG. 13 is a view illustrating another example of a method in which a receiving device and a relay device of a communication system receive data, according to an embodiment of the present disclosure.

FIG. 13 illustrates another example of a method in which a receiving device and a relay device of a communication system receive data, according to an embodiment of the present disclosure. The embodiment of FIG. 13 relates to a method in which the relay device 1200 receives data from the transmitting device 110 and determines whether or not to output the audio data in the case where the transmitting device 110 and the receiving device 130 use a relative time.

Referring to FIG. 13, the relay device 1200 receives the reception processing time (Trx) from the receiving device 130 (1301), and separately, or simultaneously, receives audio data and video output time (Vt) information from the transmitting device 110 (1303). Here, the video output time (Vt) information contains an effective time (Tn, Tm, or Tnm) of the video data output or a delayed relative time of the video data.

In addition, the relay device 1200 records the time (R1) when the audio data is received (1305), and records the time (R2) when the audio data is transmitted to the receiving device 130 (1307).

The relay device 1200 may calculate the relay processing time (Rxt) by using the time (R1) when the audio data is received and the time (R2) when the audio data is transmitted to the receiving device 130 (1309). In addition, the relay device 1200 determines whether to transmit the audio data based on the relay processing time (Rxt) and the video output time (Vt) information (1311). For example, if the relay processing time (Rxt) is shorter than the margin time contained in the video output time (Vt) information, the relay device 1200 determines to transmit the audio data, whereas if the relay processing time (Rxt) is longer than the margin time contained in the video output time (Vt) information, the relay device 1200 determines not to transmit the audio data. When the relay device 1200 determines to transmit the audio data, the relay device 1200 transmits the audio data to the receiving device 130 (1313).

In addition, when the receiving device 130 receives the audio data from the relay device 1200, the receiving device 130 may output the audio data (1315).

As described with reference to FIGS. 8, 9, 10, 11, and 12, the receiving device 130 may output the audio data to be synchronized with the video data that is output in the transmitting device 110.

The receiving device 130 may provide a data service to the user through the following UI method by using the communication system described above, according to the embodiment of the present disclosure.

Figure 14A:
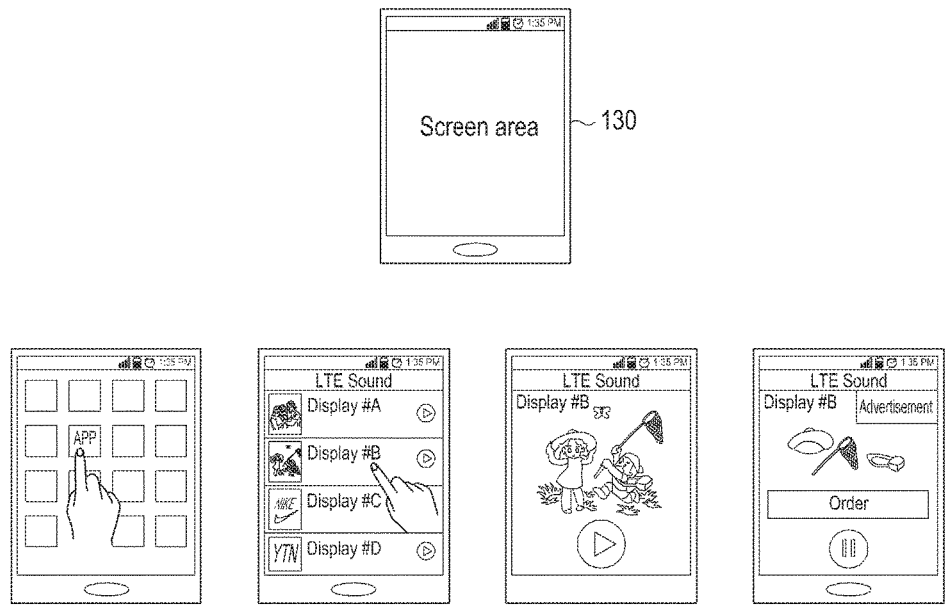
FIGS. 14A and 14B are views illustrating an example in which a receiving device of a communication system outputs user input (UI) data, according to an embodiment of the present disclosure.
Figure 14B:
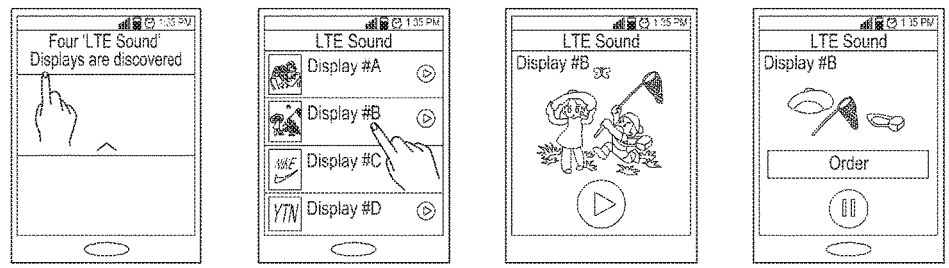

FIGS. 14A and 14B illustrates an example in which a receiving device of a communication system outputs UI data, according to an embodiment of the present disclosure. The example of FIGS. 14A and 14B shows that the receiving device 130 includes a video output unit (i.e., a screen area) for outputting UI data.

Referring to FIGS. 14A and 14B, the receiving device 130 may receive an event that requests the output of the audio data, according to the embodiment of the present disclosure. At this time, the event may be received by means of a request for the execution of the corresponding application (a) or by means of an input of the corresponding URL in a web browser (b). As another example, when one or more transmitting devices 110 are detected on the periphery, the receiving device 130 may display (e.g., on a screen area thereof) a notification indicating that one or more transmitting devices 110 have been detected on the periphery, and if the notification is selected, the receiving device 130 may identify that the event has been received. As an example of a method for displaying the notification in the receiving device 130, an upper notification window may be used in the screen area. The notification window may display necessary information that contains the number of detected transmitting devices 110, according to the embodiment of the present disclosure. As another example, the notification may be displayed by a pop-up window in the screen area, or may be output by means of a light or a vibration.

When the receiving device 130 receives an event for requesting the output of the audio data, according to the embodiment of the present disclosure, the receiving device 130 outputs a display list in the screen area through a web browser, a locked screen, or a specific App screen. At this time, the receiving device 130 outputs the display list based on the video information that is received from the transmitting device 110. The display list may be sorted according to at least one of the distance to the transmitting device 110 that provides videos, the category, the recent output list, the wish list, or the user configuration, and may contain at least one of thumbnails of the video data, a display ID, the title of the video data, or a summary thereof, In addition, when a selection event for selecting one piece of content is received based on the display list, the receiving device 130 may display an output button for outputting the content in the screen area. At this time, the selection event may be received by the user's action of touching, or sliding, the display list. In addition, the output button may be used for "Quick Play" to immediately output the audio data when the user wishes to promptly listen to the audio data. That is, when one piece of content is selected and the audio data is received from the transmitting device 110, the receiving device 130 may display the output button in the screen area. On the contrary, if the receiving device 130 receives data other than the audio data, the receiving device 130 may display other means for outputting the corresponding information instead of the output button.

As another example, although it is not shown in FIGS. 14A and 14B, the display list may have a map on which the position of the display is marked. At this time, a method of displaying an icon of the display and the map in the screen area of the receiving device 130 may vary according to the embodiments. The map may be displayed in the form of a 3D map or a street view that is the modelling of actual street pictures. At this time, in the case of a 3D map, it is possible to display a spherical, or hemispherical, map.

The receiving device 130 proposed in the present disclosure may output the received video information in the screen area. In addition, in the case where the received video-related data contains at least one piece of text data or image data, the receiving device 130 may output at least one piece of the text data or the image data in the screen area. For example, the receiving device 130 may output an equalizer, an advertisement, or a main image of a video together with the audio data in the screen area. In addition, the receiving device 130 may output an information list of products, places, or persons in the video, or a performance poster in the screen area. Additionally, the receiving device 130 may place an order for the product, or may book the performance according to a request event that is generated.

Figure 15A:
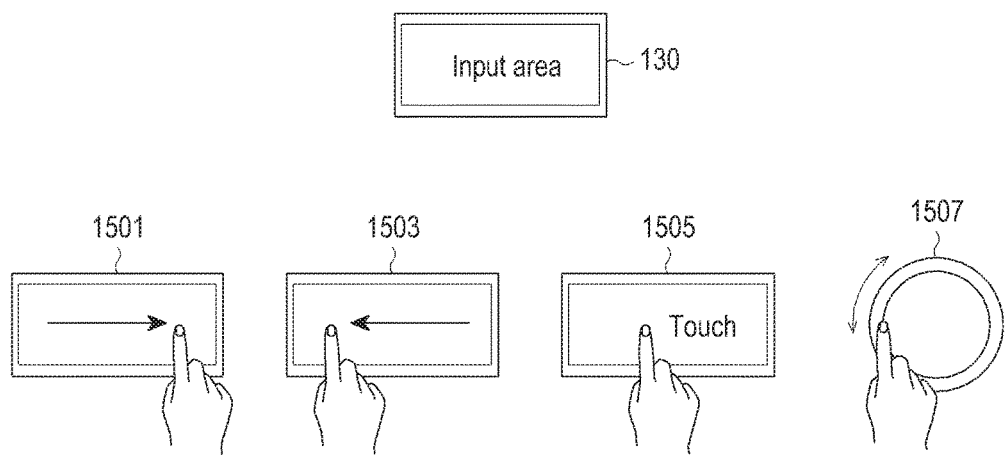
FIGS. 15A and 15B are views illustrating another example in which a receiving device of a communication system outputs UI data, according to an embodiment of the present disclosure.
Figure 15B:
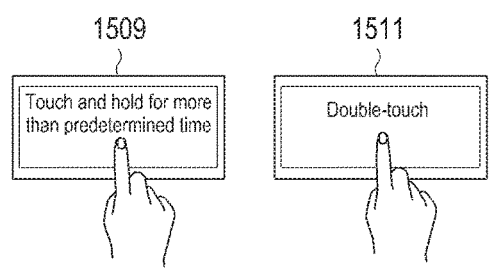

FIGS. 15A and 15B illustrate another example in which a receiving device of a communication system outputs UI data, according to an embodiment of the present disclosure. The example of FIGS. 15A and 15B show that the receiving device 130 has only an input unit (i.e., an input area).

Referring to FIGS. 15A and 15B, the input area of the receiving device 130 may be variously configured by a capacitive type, a pressure-sensitive type, a button type, or a dial type, and may further include additional sensors or devices according to the embodiments.

For example, when the receiving device 130 receives an event for requesting the output of audio data, according to the embodiment of the present disclosure, through the input area, the receiving device 130 may output, to the audio output unit, audio data that is received from the nearest transmitting device 110 by using distance information. As another example, in the case where there are external auxiliary devices (e.g., a camera, an infrared sensor, a gyro sensor, or a magnetic device) that are connected to the receiving device 130, the display list may be output by using the auxiliary devices. Here, the event may be received by means of the user's eyes or touch, or the photographing by a camera.

Afterwards, the receiving device 130 may receive an event for requesting the output of the content that is currently output and other content through the input area (a). The event that is received through the input area may be detected in various manners. For example, the receiving device 130 may detect the event by means of a sliding motion in the input area. That is, with reference to FIG. 15A, when a sliding motion (1501) to the right is detected in the input area, the receiving device 130 outputs the next content, and when a sliding motion (1503) to the left is detected, the receiving device 130 outputs the previous content. As another example, the receiving device 130 may detect the event by means of time information of a touch (1505) onto the input area. That is, when a motion of touching the input area is detected for a time, which is shorter than a predetermined time, the receiving device 130 may output the next content, and when a motion of touching the input area is detected for a time, which is longer than a predetermined time, the receiving device 130 may output the previous content. As another example, the receiving device 130 may detect the event by means of the rotational direction (1507) of the dial type of input area, as shown in FIG. 15A. That is, when a rotational motion in the clockwise direction is detected, the receiving device 130 may output the next content, and when a rotational motion in the counterclockwise direction is detected, the receiving device 130 may output the previous content. In the content searching method of the embodiment above, the selection of the content according to the sliding direction, the touch duration, or the rotational direction and speed of the dial may vary depending on the system and the user configuration. In addition, the receiving device 130 may output the content name or the display name in a voice when the content is switched. Additionally, the receiving device 130 may return to the original state, or may output a beep sound if there is no more content to be switched, as necessary.

In addition, with reference to FIG. 15B, the receiving device 130 may receive an event for requesting the storing of the content that is output through the input area. For example, the receiving device 130 may detect the event by means of a motion (1509) of touching and holding the input area for a constant time or more. As another example, the receiving device 130 may detect the event by means of a motion (1511) of touching the input area a predetermined number of times.

Figure 16:
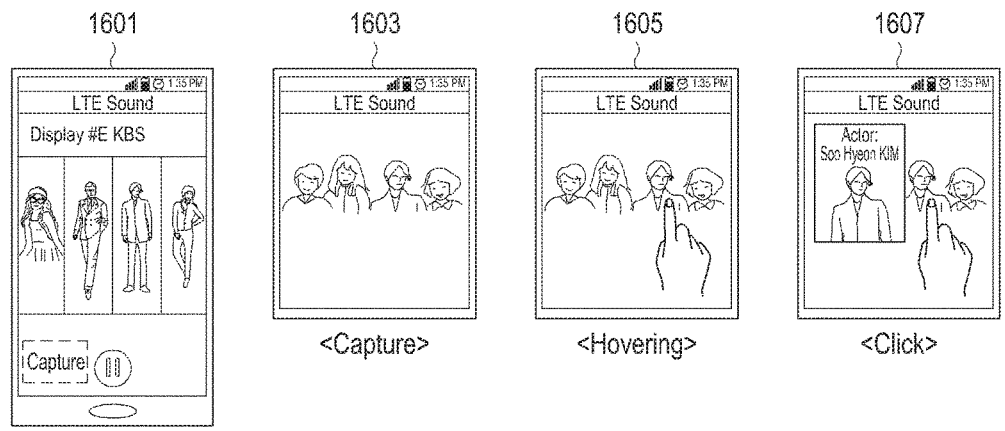
FIG. 16 is a view illustrating another example in which a receiving device of a communication system outputs UI data, according to an embodiment of the present disclosure.

FIG. 16 illustrates another example in which a receiving device of a communication system outputs UI data, according to an embodiment of the present disclosure. The embodiment of FIG. 16 shows the case where the transmitting device 110 outputs a video and the receiving device 130 outputs a sound. However, the embodiment of the present disclosure may be applied to other cases.

Referring to FIG. 16, when an event occurs in order to capture a piece of content of interest among places, persons, or objects in the video (1601) that is output in the transmitting device 110, a snapshot containing the corresponding content of interest is displayed on the video output unit of the receiving device 130 (1603). For example, the capture event may be performed by a key input button corresponding to the capture of the receiving device 130. The key input button corresponding to the captured may be provided in the form of a separate icon in the screen of the receiving device 130, or may be implemented by a slide in the screen area of the receiving device 130, a combination of touches, gestures, physical buttons provided in the receiving device 130, or a combination thereof.

In addition, when the receiving device 130 detects a hovering event for the snapshot that is output through the video output unit, the receiving device 130 displays information stating that there is additional information for the snapshot (1605). The method of displaying the information stating that there is additional information may include flashing, showing a specific pattern or icon, or changing colors.

Afterwards, when the receiving device 130 detects a selection event for selecting a specific portion in the snapshot that is output through the video output unit, the receiving device 130 outputs information that is related to the selected portion (1607). At this time, the receiving device 130 may output the information related to the selected portion by using a pop-up window or by using the upper, bottom, or side margins of the video output unit. For example, if the selected portion corresponds to a person, the receiving device 130 may output a profile about the person, and if the selected portion corresponds to clothing, the receiving device 130 may output information, such as the model name or retail prices thereof.

Figure 17:
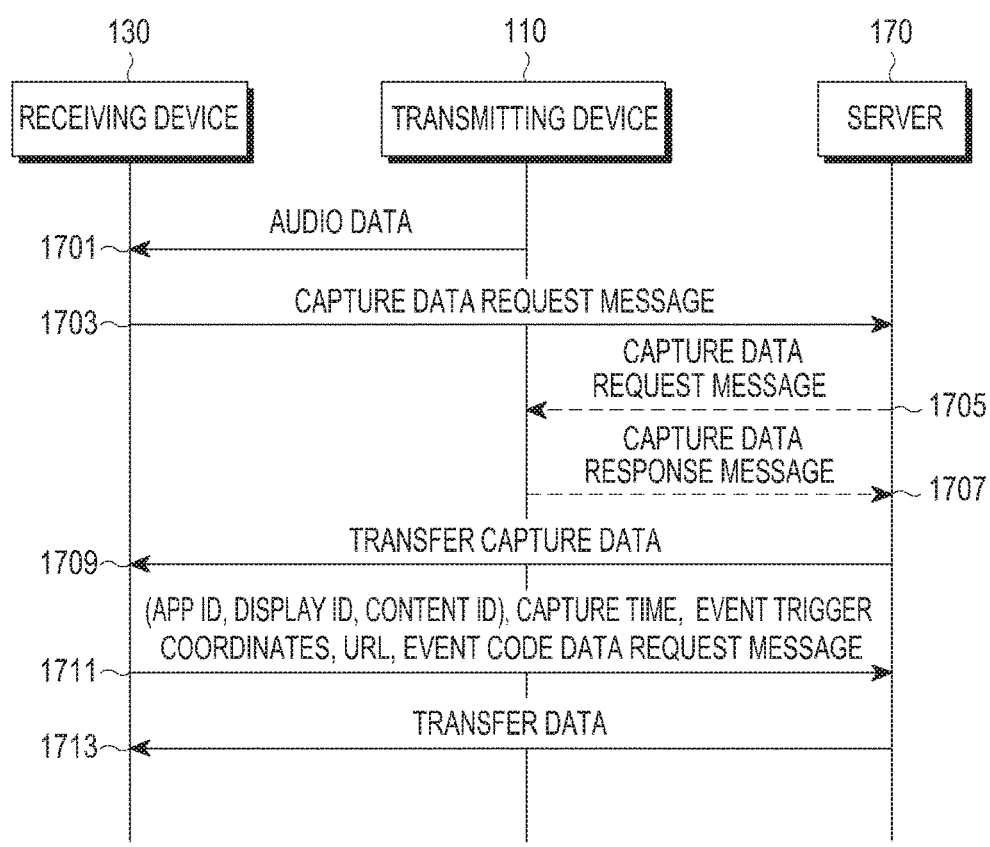
FIG. 17 is a view illustrating an example of a method in which a receiving device of a communication system performs the embodiment of FIG. 16, according to an embodiment of the present disclosure.

More specifically, similar to the embodiment shown in FIG. 17, the embodiment shown in FIG. 16 may be performed by the data transmission/reception among the receiving device 130, the transmitting device 110, and the server 170.

FIG. 17 illustrates an example of a method in which a receiving device of a communication system performs the embodiment of FIG. 16, according to an embodiment of the present disclosure. Here, the examples illustrated in FIG. 16 and FIG. 17 may be applied to the communication environment that has been described with reference to FIGS. 2C and 2D.

Referring to FIG. 17, the transmitting device 110 outputs video data and transmits video-related data containing audio data to the receiving device 130 (1701). When the receiving device 130 receives a capture event for a piece of content of interest among places, persons, or objects in the video that is output in the transmitting device 110 while outputting the audio data, the receiving device 130 transmits a request message for capture data to the server 170 (1703).

Here, the capture data request message contains at least one of an application ID, a display ID, a content ID, the time when a capture command is triggered, or the address of the receiving device 130. The application ID, the display ID, or the content ID may be contained in the received audio data according to the embodiments. The application ID may refer to a separator that is used in the application area, and for example, may be GOM Player, YouTube, or the like. The application ID may be available only when it is registered and permitted according to the policy of the server. The display ID proposed in the embodiment of the present disclosure is intended to separate the transmitting device 110, and may be a device ID, a subscriber ID, or an ID that is specified by the user. The content ID proposed in the embodiment of the present disclosure is used to separate the video-related data (for example, audio content) that is transmitted from one transmitting device 110. Therefore, the capture data may contain one or more content IDs. For example, if one piece of video data supports audio data in three languages, the capture data may contain three content IDs that are separated according to the language. As another example, all or some pieces of the audio data are downloaded from the server 170, the capture data may contain, as the content IDs, URL information for obtaining the audio data. As another example, if a number of pieces of video data are being output through the transmitting device 110, the audio data of the video content may be separated through the content IDs. As described above, the capture data may separate actual information that is related to the audio content, and may have a hierarchical structure according to the management policy of the application ID, the display ID, and the content ID.

With reference to FIG. 17, the time when the capture command is triggered may be an absolute time or a relative time when the audio data is received according to the embodiment. If the receiving device 130 is able to know the frame number of the video data, the frame number may also be used as the time when the capture command is triggered. The address of the receiving device 130 contains the IP Address by which the receiving device 130 may receive a response of information later.

If the server 170 that has received the capture data from the receiving device 130 maps at least one of the application ID, the display ID, or the content ID with the original of the video/audio data to then store the same as a list, the capture data containing a still image of the video data may be transmitted to the receiving device 130 based on at least one of the application ID, the display ID, or the content ID and the time when the capture command is triggered (1709). At this time, the still image is comprised of (x, y) coordinates, and the capture data may contain coordinates, the event name, the code, or the URL, by which additional information can be triggered. For example, if coordinates (6, 4) can trigger an event for clothing at the requested still image time, the server 170 transmits the still image for a capture message and the coordinates (6, 4). Here, additionally, if the server 170 does not have the original video/audio data, the server 170 may transmit a capture data request message to the transmitting device 110 in order to obtain information on the requested capture data (1705), and may receive a capture data response message from the transmitting device 110 (1707).

Afterwards, the receiving device 130 outputs a still image corresponding to the capture data through a video output unit, and when a selection event is detected in order to obtain additional information on a specific portion of the output still image, the receiving device 130 transmits, to the server 170, a request message for data that is related to the specific portion (1711). Here, the data request message contains at least one of an application ID, a display ID, a content ID, a capture time, event coordinates, the event name, or the event code.

The server 170 transfers, to the receiving device 130, additional information on the specific portion based on the information contained in the data request message, and if the URL is contained, the server 170 transmits, to the receiving device 130, the additional information that matches the URL or the event name or code information (1713).

Figure 18:
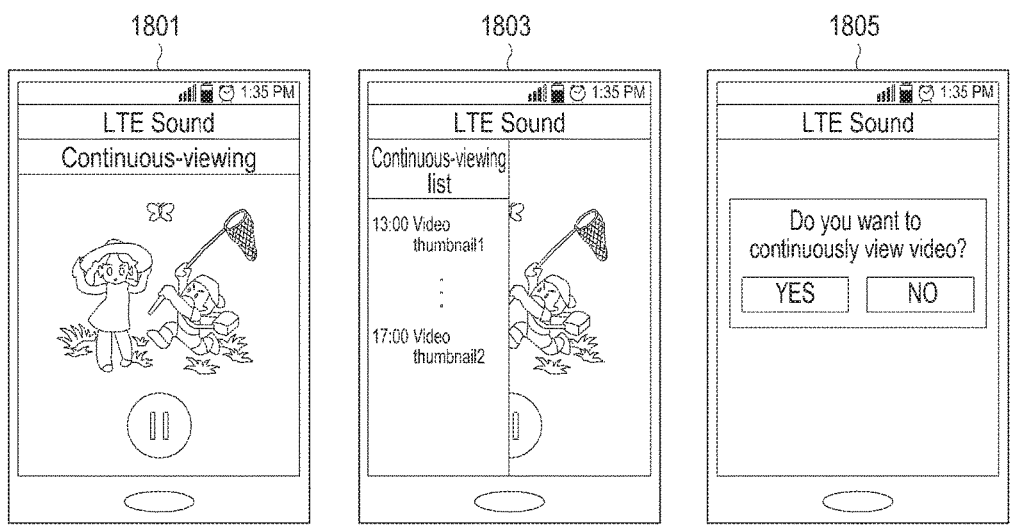
FIG. 18 is a view illustrating another example in which a receiving device of the communication system outputs UI data, according to an embodiment of the present disclosure.

FIG. 18 illustrates another example for outputting UI data in a receiving device of a communication system, according to an embodiment of the present disclosure. The embodiment of FIG. 18 relates to the case where an event for triggering a continuous viewing function of video data occurs in the receiving device 130. For example, the embodiment of FIG. 18 relates to the output of the video data in the receiving device 130 in a case where: an interruption of the audio data occurs in the receiving device 130; the audio data has not received; or the audio data cannot be received from the transmitting device 110 because the receiving device 130 moves far away from the transmitting device 110.

For example, when the receiving device 130 detects an event for triggering the continuous video viewing function with respect to specific content, the receiving device 130 may make a request to the server 170 for data corresponding to the triggering event, and may receive video data and audio data for the specific content from the server 170.

Here, with reference to FIG. 18, the continuous video viewing function may be provided in the form of a separate icon in the screen of the receiving device 130, and the triggering event may be detected by a slide in the screen area, a combination of touches, gestures, physical buttons provided in the receiving device, or a combination thereof (1801). In addition, the receiving device 130 may make a list of the video data that has been output through the transmitting device 110 and the audio data that has been previously output to then store the same. The list may contain information, such as the title, a thumbnail, or the last viewing time of the video content. Therefore, when the receiving device 130 detects an event for triggering the continuous video viewing function with respect to a piece of content in the list, the receiving device 130 may make a request to the server 170 for data corresponding to the triggering event, and may receive video data and audio data for the specific content from the server 170.

At this time, when a sliding event is detected in the left side of the video output unit, the receiving device 130 may output the list in the left side of the video output unit, and when a button input is detected, which is provided in the upper or bottom portion, the receiving device 130 may output the list (1803). The list may be sorted in the order of time, genre, event, or preference.

As another embodiment, when the receiving device 130 moves away more than a constant distance from the transmitting device 110, when the signal is attenuated more than a predetermined value or cannot be received, or when the receiving device 130 fails to decode the received data a constant number of times or more, the receiving device 130 may trigger the continuous video viewing function. At this time, when the continuous video viewing function is triggered, the receiving device 130 may display "view video continuously" to confirm the user's intention in the form of a pop-up window on the screen area of the video output unit (1805). In addition, when a positive event to execute the continuous video viewing function is detected from the pop-up window, the receiving device 130 may continuously display the data following the data that was output last time.

Figure 19:
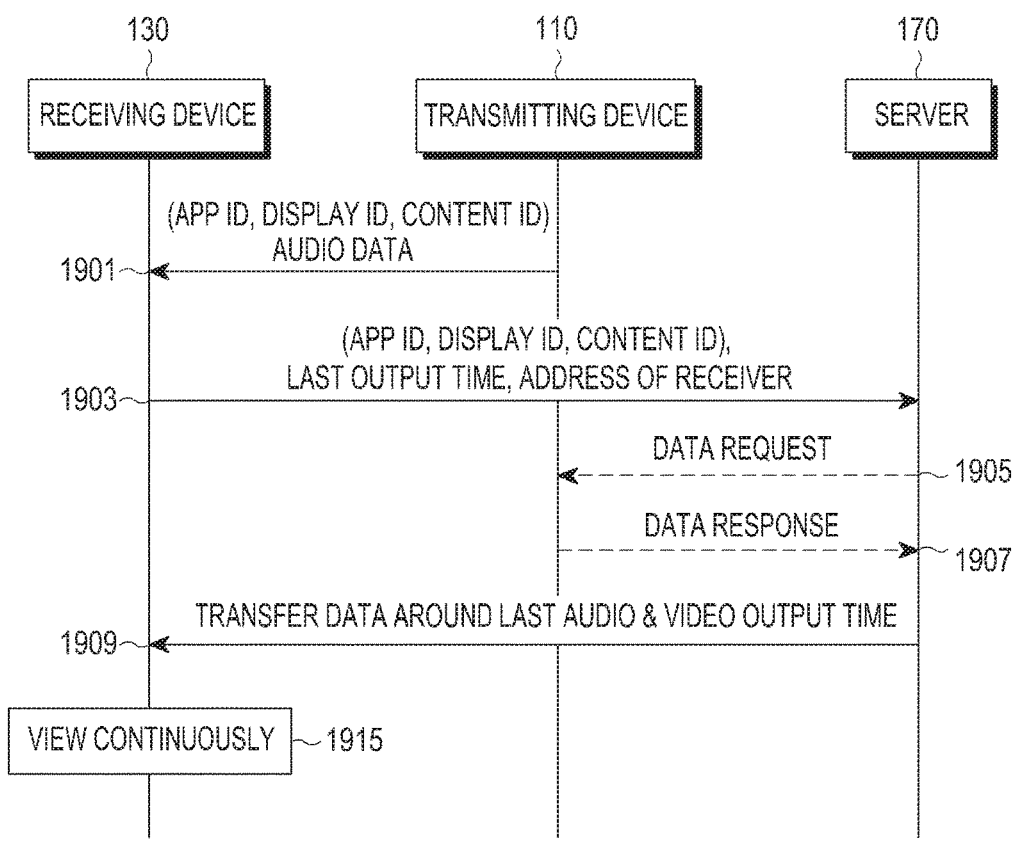
FIG. 19 is a view illustrating an example of a method in which a receiving device of a communication system performs the embodiment of FIG. 18, according to an embodiment of the present disclosure.

FIG. 19 illustrates an example of a method in which a receiving device of a communication system performs the embodiment of FIG. 18, according to an embodiment of the present disclosure.

Referring to FIG. 19, the transmitting device 110 transmits video-related data that contains audio data to the receiving device 130 (1901). At this time, the video-related data contains at least one of an application ID, a display ID, or a content ID.

In addition, when an event for triggering a continuous video viewing function is detected through a video output unit, the receiving device 130 transmits a request message for video and audio data to the service 170 (1903). Here, the request message contains at least one of the application ID, the display ID, the content ID, the output time (i.e., the last output time) of the video and audio data when the continuous video viewing function is triggered, or the address of the receiving device 130.

If the server 170 does not have the information on the video and audio data with respect to the transmitting device 110, the server 170 makes a request to the transmitting device 110 for the video and audio data (1905), and receives, from the transmitting device 110, the requested video and audio data (1907).

If the server 170 maps at least one of the application ID, the display ID, or the content ID with the original of the video and audio data to then store the same as a list, the server 170 transmits, to the receiving device 130, the video and audio data following the data of the last output time contained in the request message. Accordingly, the receiving device 130 may continuously output the video and audio data following the data of the last output time, which is transmitted from the server 170, through a video output unit and an audio output unit. That is, the receiving device 130 may execute the continuous video viewing function based on the video and audio data stored in the server 170 (1915). The operation of the server 170 may be performed in the transmitting device 110.

Figure 20:
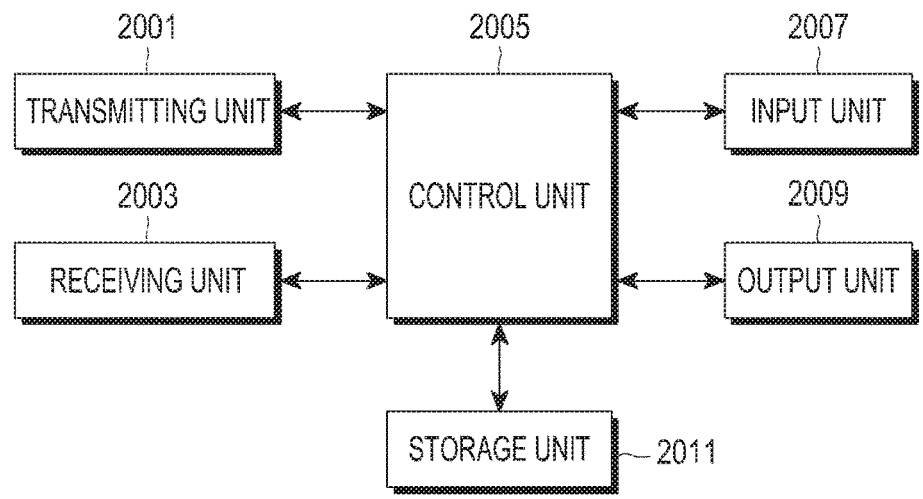
FIG. 20 is a view schematically illustrating an example of an internal structure of a transmitting device for transmitting data in a communication system, according to an embodiment of the present disclosure.

FIG. 20 schematically illustrates an example of an internal structure of a transmitting device for transmitting data in a communication system, according to an embodiment of the present disclosure.

Referring to FIG. 20, the transmitting device 110 includes a transmitting unit 2001, a receiving unit 2003, a control unit 2005, an input unit 2007, an output unit 2009, and a storage unit 2011.

First, the control unit 2005 controls overall operations of the transmitting device 110, and particularly controls the operation that is related to the data transmission, which is performed in the communication system, according to an embodiment of the present disclosure. The operation related to the data transmission, which is performed in the communication system, according to an embodiment of the present disclosure, has been described in FIGS. 1, 2A, 2B, 2C, 2D, 3, 4, 5A, 5B, 6, and 7, so the detailed description thereof will be omitted here.

The transmitting unit 2001 transmits various signals and various messages to other entities (e.g., the broadcast device, the radio node, the gateway, or the server) that are included in the communication system according to the control of the control unit 2005. Here, the various signals and various messages transmitted by the transmitting unit 2001 have been described in FIGS. 1, 2A, 2B, 2C, 2D, 3, 4, 5A, 5B, 6, and 7, so the detailed description thereof will be omitted here.

In addition, the receiving unit 2003 receives various signals and various messages from other entities (e.g., the broadcast device, the radio node, the gateway, or the server) that are included in the communication system according to the control of the control unit 2005. Here, the various signals and various messages received by the receiving unit 2003 have been described in FIGS. 1, 2A to 2D, 3, 4, 5A, 5B, 6, and 7, so the detailed description thereof will be omitted here.

The storage unit 2011 stores programs and data that are related to the operation of transmitting data, which is performed in the communication system under the control of the control unit 2005, according to an embodiment of the present disclosure. In addition, the storage unit 2011 stores various signals and various messages that are received by the receiving unit 2003 from other entities.

The input unit 2007 and the output unit 2009 input and output various signals and various messages that are related to the operation of transmitting data, which is performed in the communication system under the control of the control unit 2005, according to an embodiment of the present disclosure. In addition, the output unit 2009 includes a video output unit for outputting video data.

Meanwhile, although the transmitting unit 2001, the receiving unit 2003, the control unit 2005, an input unit 2007, the output unit 2009, and the storage unit 2011 are illustrated to be separated from each other in FIG. 20, the transmitting device 110 may be implemented such that at least two of the transmitting unit 2001, the receiving unit 2003, the control unit 2005, an input unit 2007, the output unit 2009, or the storage unit 2011 are integrated. In addition, the transmitting device 110 may be implemented by a single processor.

Figure 21:
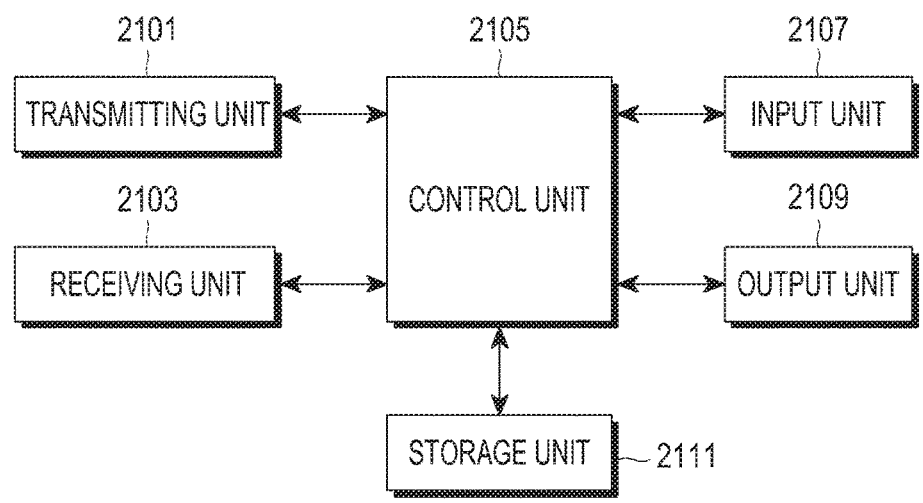
FIG. 21 is a view schematically illustrating an example of an internal structure of a receiving device for receiving data in a communication system, according to an embodiment of the present disclosure.

FIG. 21 schematically illustrates an example of an internal structure of a receiving device for receiving data in a communication system, according to an embodiment of the present disclosure.

Referring to FIG. 21, the receiving device 130 includes a transmitting unit 2101, a receiving unit 2103, a control unit 2105, an input unit 2107, an output unit 2109, and a storage unit 2111.

First, the control unit 2105 controls overall operations of the receiving device 130, and particularly controls the operation that is related to the data reception, which is performed in the communication system, according to an embodiment of the present disclosure. The operation related to the data reception, which is performed in the communication system, according to an embodiment of the present disclosure, has been described in FIGS. 8, 9, 10, 11, 12, 13, 14A, 14B, 15A, 15B, 16, 17, 18, and 19, so the detailed description thereof will be omitted here.

The transmitting unit 2101 transmits various signals and various messages to other entities (e.g., the broadcast device, the radio node, the gateway, or the server) that are included in the communication system according to the control of the control unit 2105. Here, the various signals and various messages transmitted by the transmitting unit 2101 have been described in FIGS. 8, 9, 10, 11, 12, 13, 14A, 14B, 15A, 15B, 16, 17, 18, and 19, so the detailed description thereof will be omitted here.

In addition, the receiving unit 2103 receives various signals and various messages from other entities (e.g., the broadcast device, the radio node, the gateway, or the server) that are included in the communication system according to the control of the control unit 2105. Here, the various signals and various messages received by the receiving unit 2103 have been described in FIGS. 8, 9, 10, 11, 12, 13, 14A, 14B, 15A, 15B, 16, 17, 18, and 19, so the detailed description thereof will be omitted here.

The storage unit 2111 stores programs and data that are related to the operation of receiving data, which is performed in the communication system under the control of the control unit 2105, according to an embodiment of the present disclosure. In addition, the storage unit 2111 stores various signals and various messages that are received by the receiving unit 2103 from other entities.

The input unit 2107 and the output unit 2109 input and output various signals and various messages that are related to the operation of receiving data, which is performed in the communication system under the control of the control unit 2105, according to an embodiment of the present disclosure. In addition, the output unit 2109 includes at least one of a video output unit for outputting video data or an audio output unit for outputting audio data.

Meanwhile, although the transmitting unit 2101, the receiving unit 2103, the control unit 2105, an input unit 2107, the output unit 2109, and the storage unit 2111 are illustrated to be separated from each other in FIG. 21, the receiving device 130 may be implemented such that at least two of the transmitting unit 2101, the receiving unit 2103, the control unit 2105, an input unit 2107, the output unit 2109, or the storage unit 2111 are integrated. In addition, the receiving device 130 may be implemented by a single processor.

Figure 22:
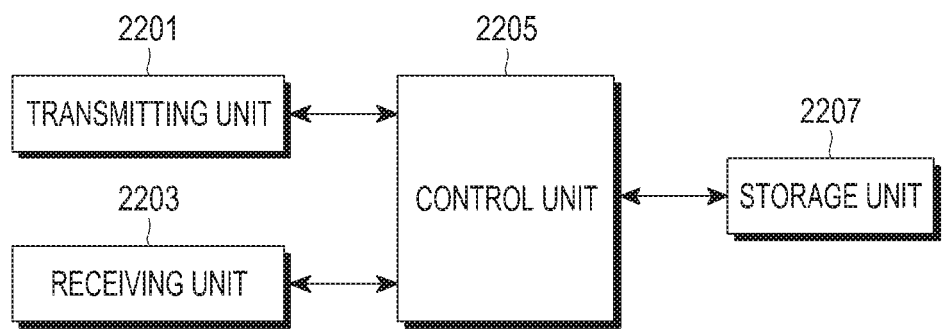
FIG. 22 is a view schematically illustrating an example of an internal structure of a relay device for transmitting and receiving data in a communication system, according to an embodiment of the present disclosure.

FIG. 22 schematically illustrates an example of an internal structure of a relay device for transmitting and receiving data in a communication system, according to an embodiment of the present disclosure.

Referring to FIG. 22, the relay device 1200 includes a transmitting unit 2201, a receiving unit 2203, a control unit 2205, and a storage unit 2207.

First, the control unit 2205 controls overall operations of the relay device 1200, and particularly controls the operation that is related to the data transmission and reception, which is performed in the communication system, according to an embodiment of the present disclosure. The operation that is related to the data transmission and reception, which is performed in the communication system, according to an embodiment of the present disclosure, has been described in FIGS. 1, 2A to 2D, 4, 12, 13, 17, and 19, so the detailed description thereof will be omitted here.

The transmitting unit 2201 transmits various signals and various messages to other entities (e.g., the transmitting device, the receiving device, the broadcast device, the radio node, the gateway, or the server) that are included in the communication system according to the control of the control unit 2205. Here, the various signals and various messages transmitted by the transmitting unit 2201 have been described in FIGS. 1, 2A to 2D, 4, 12, 13, 17, and 19, so the detailed description thereof will be omitted here.

In addition, the receiving unit 2203 receives various signals and various messages from other entities (e.g., the transmitting device, the receiving device, the broadcast device, the radio node, the gateway, or the server) that are included in the communication system according to the control of the control unit 2205. Here, the various signals and various messages received by the receiving unit 2203 have been described in FIGS. 1, 2A to 2D, 4, 12, 13, 17, and 19, so the detailed description thereof will be omitted here.

The storage unit 2207 stores programs and data that are related to the operation of transmitting and receiving data, which is performed in the communication system under the control of the control unit 2205, according to an embodiment of the present disclosure. In addition, the storage unit 2207 stores various signals and various messages that are received by the receiving unit 2203 from other entities.

Meanwhile, although the transmitting unit 2201, the receiving unit 2203, the control unit 2205, and the storage unit 2207 are illustrated to be separated from each other in FIG. 22, the relay device 1200 may be implemented such that at least two of the transmitting unit 2201, the receiving unit 2203, the control unit 2205, or the storage unit 2207 are integrated. In addition, the relay device 1200 may be implemented by a single processor.

While the present disclosure has been shown described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting data by a transmitting device in a broadband wireless communication system that supports device-to-device (D2D) communication, the method comprising:
    identifying audio data related to video data and text data related to the video data from a video content;
    determining time information on video output time when the video data is played at the transmitting device;
    transmitting the audio data and the time information to one or more receiving devices on a first radio frequency (RF) by using a first radio access technology (RAT); and
    transmitting the text data to the one or more receiving devices on a second RF by using a second RAT,
    wherein the first RAT is different from the second RAT, and the first RF is different from the second RF,
    wherein the first RAT is the D2D communication in the broadband wireless communication system, between the transmitting device and the one or more receiving devices, and
    wherein the second RAT is a Wi-Fi technology.

2. The method of claim 1, the method further comprising:
    reproducing the video data at the transmitting device based on the time information.

3. The method of claim 2,
    wherein the determining of the time information comprises:
        identifying, from the video data, a first time to reproduce the video data;
        acquiring a delay time before reproducing the video data; and
        obtaining a second time based on the first time and the delay time, and
    wherein the delay time is related to at least one of a processing time for transmitting the audio data or a scheduling time of allocating radio resources.

4. The method of claim 3, wherein the time information includes at least one of the first time, the delay time, the second time, an effective time when the video data is output, or a margin time when the video data is delayed.

5. The method of claim 1, wherein the transmitting of the audio data and the time information comprises:
 identifying a transmission time of the audio data;
 determining whether to transmit the audio data based on the time information and the transmission time; and
 transmitting the audio data and the time information based on the determination.

6. The method of claim 5, wherein the audio data and the time information are transmitted at the transmission time if the transmission time is earlier than the time information.

7. The method of claim 1, wherein the text data comprises subtitles related to the video data.

8. The method of claim 1, wherein the first RAT is the D2D communication using a common frequency for public safety in the broadband wireless communication system.

9. A method for receiving data by a receiving device in a broadband wireless communication system that supports device-to-device (D2D) communication, the method comprising:
 receiving, from a transmitting device, audio data related to video data and time information on video output time when the video data is played at the transmitting device, on a first radio frequency (RF) by using a first radio access technology (RAT);
 receiving, from the transmitting device, text data related to the video data on a second RF by using a second RAT; and
 outputting the audio data and the text data based on the time information,
 wherein the first RAT is different from the second RAT, and the first RF is different from the second RF,
 wherein the first RAT is the D2D communication in the broadband wireless communication system, between the transmitting device and one or more receiving devices, and
 wherein the second RAT is a Wi-Fi technology.

10. The method of claim 9, wherein the outputting of the audio data comprises:
 identifying, from the audio data, a first time to output the audio data;
 determining whether to output the audio data based on the time information and the first time; and
 outputting the audio data at the first time based on the determination.

11. The method of claim 10, wherein the audio data is output at the first time if a difference value between the first time and the time information is less than a predetermined threshold value.

12. The method of claim 9, wherein the outputting of the audio data comprises:
 identifying, from the audio data, a first time to output the audio data;
 identifying a second time when the audio data is received;
 obtaining a processing time based on the first time and the second time;
 determining whether to output the audio data based on the time information and the processing time; and
 outputting the audio data at the first time based on the determination.

13. The method of claim 12, wherein the audio data is output at the first time if the processing time is less than the time information.

14. The method of claim 12, wherein the outputting of the audio data comprises:
 obtaining a third time based on the time information and the processing time; and
 outputting the audio data at the third time based on the determination.

15. The method of claim 9, wherein the time information includes at least one of a first time to output the video data, a delay time, the second time that is obtained based on the first time and the delay time, an effective time when the video data is output, or a margin time when the video data is delayed.

16. The method of claim 15, wherein the delay time is related to at least one of a processing time for transmitting the audio data or a scheduling time of allocating radio resources.

17. The method of claim 9, wherein the text data comprises subtitles related to the video data.

18. The method of claim 9, wherein the first RAT is the D2D communication using a common frequency for public safety in the broadband wireless communication system.

19. A transmitting device for transmitting data in a broadband wireless communication system that supports device-to-device (D2D) communication, the transmitting device comprising:
 a transceiver; and
 at least one processor configured to:
  identifying audio data related to video data and text data related to the video data from a video content,
  determining time information on video output time when the video data is played at the transmitting device, and
  control the transceiver to transmit the audio data and the time information to one or more receiving devices on a first radio frequency (RF) by using a first radio access technology (RAT) and to transmit the text data to the one or more receiving devices on a second RF by using a second RAT,
 wherein the first RAT is different from the second RAT, and the first RF is different from the second RF,
 wherein the first RAT is the D2D communication in the broadband wireless communication system, between the transmitting device and the one or more receiving devices, and
 wherein the second RAT is a Wi-Fi technology.

20. The transmitting device of claim 19, wherein the at least one processor is further configured to reproduce the video data based on the time information.

21. The transmitting device of claim 20,
 wherein the at least one processor is further configured to:
  identify, from the video data, a first time to reproduce the video data;
  acquire a delay time before reproducing the video data; and
  obtain a second time based on the first time and the delay time,
 wherein the delay time is related to at least one of a processing time for transmitting the video related data or a scheduling time of allocating radio resources.

22. The transmitting device of claim 21, wherein the time information includes at least one of the first time, the delay time, the second time, an effective time when the video data is output, or a margin time when the video data is delayed.

23. The transmitting device of claim 19, wherein the at least one processor is further configured to:
 identify a transmission time of the audio data;
 determine whether to transmit the audio data based on the time information and the transmission time; and
 control the transceiver to transmit the audio data and the time information based on the determination.

24. The transmitting device of claim 23, wherein the audio data and the time information are transmitted at the transmission time if the transmission time is earlier than the time information.

25. The transmitting device of claim 19, wherein the text data comprises subtitles related to the video data.

26. The transmitting device of claim 19, wherein the first RAT is the D2D communication using a common frequency for public safety in the broadband wireless communication system.

27. A receiving device for receiving data in a broadband wireless communication system that supports device-to-device (D2D) communication, the receiving device comprising:
- a transceiver configured to:
  - receive, from a transmitting device, audio data related to video data and time information on video output time when the video data is played at the transmitting device, on a first radio frequency (RF) by using a first radio access technology (RAT), and
  - receive, from the transmitting device, text data related to the video data on a second RF by using a second RAT; and
- at least one processor configured to output the audio data and the text data based on the time information,
- wherein the first RAT is different from the second RAT, and the first RF is different from the second RF,
- wherein the first RAT is the D2D communication in the broadband wireless communication system, between the transmitting device and one or more receiving devices, and
- wherein the second RAT is a Wi-Fi technology.

28. The receiving device of claim 27, wherein the at least one processor is further configured to:
- identify, from the audio data, a first time to output the audio data;
- determine whether to output the audio data based on the time information and the first time; and
- output the audio data at the first time based on the determination.

29. The receiving device of claim 28, wherein the audio data is output at the first time if a difference value between the first time and the time information is less than a predetermined threshold value.

30. The receiving device of claim 27, wherein the at least one processor is further configured to:
- identify, from the audio data, a first time to output the audio data;
- identify a second time when the audio data is received;
- obtain a processing time based on the first time and the second time;
- determine whether to output the audio data based on the time information and the processing time; and
- output the audio data at the first time based on the determination.

31. The receiving device of claim 30, wherein the audio data is output at the first time if the processing time is less than the time information.

32. The receiving device of claim 30, wherein the at least one processor is further configured to:
- obtain a third time based on the time information and the processing time; and
- output the audio data at the third time based on the determination.

33. The receiving device of claim 27, wherein the time information includes at least one of a first time to output the video data, a delay time, a second time that is obtained based on the first time and the delay time, an effective time when the video data is output, or a margin time when the video data is delayed.

34. The receiving device of claim 33, wherein the delay time is related to at least one of a processing time for transmitting the audio data or a scheduling time of allocating radio resources.

35. The receiving device of claim 27, wherein the text data comprises subtitles related to the video data.

36. The receiving device of claim 27, wherein the first RAT is the D2D communication using a common frequency for public safety in the broadband wireless communication system.

* * * * *